US012290930B2

(12) United States Patent
Gillespie et al.

(10) Patent No.: US 12,290,930 B2
(45) Date of Patent: *May 6, 2025

(54) COMPLIANCE CORRECTION IN A ROBOTIC SYSTEM

(71) Applicant: THE CLEVELAND CLINIC FOUNDATION, Cleveland, OH (US)

(72) Inventors: Callan Gillespie, Cleveland, OH (US); Robb Colbrunn, Cleveland, OH (US); Tara Nagle, Cleveland, OH (US)

(73) Assignee: THE CLEVELAND CLINIC FOUNDATION, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,193

(22) Filed: Jul. 25, 2023

(65) Prior Publication Data
US 2024/0131701 A1    Apr. 25, 2024

Related U.S. Application Data

(63) Continuation of application No. 17/157,237, filed on Jan. 25, 2021, now Pat. No. 11,745,341.

(60) Provisional application No. 62/965,328, filed on Jan. 24, 2020.

(51) Int. Cl.
*B25J 9/16* (2006.01)
*B25J 13/08* (2006.01)

(52) U.S. Cl.
CPC ........... *B25J 9/1633* (2013.01); *B25J 9/1638* (2013.01); *B25J 9/1653* (2013.01); *B25J 9/1664* (2013.01); *B25J 13/085* (2013.01); *B25J 13/088* (2013.01); *B25J 13/089* (2013.01)

(58) Field of Classification Search
CPC ...... B25J 9/1633; B25J 9/1638; B25J 9/1653; B25J 9/1664; B25J 13/089; B25J 13/085; B25J 13/088
See application file for complete search history.

(56) References Cited

U.S. PATENT DOCUMENTS 9,969,090 B2 *   5/2018  Warashina ............. B25J 9/1697
10,022,864 B2 *  7/2018  Motoyoshi ............. B25J 9/1653

OTHER PUBLICATIONS

Wang et al., 'Robot End-effector Sensing with Position Sensitive Detector and Inertial Sensors', pp. 5252-5257 (Year: 2012).*

* cited by examiner

*Primary Examiner* — Jason Holloway
*Assistant Examiner* — Christopher A Buksa
(74) *Attorney, Agent, or Firm* — Tarolli, Sundheim, Covell & Tummino LLP

(57) ABSTRACT

Movement of an object can occur while a control system corrects for compliance within a robotic system. The control system can include the object to be moved, the robotic system that moves the object, a primary sensor positioned on the object, at least one ancillary sensor positioned on the object, and a controller. The sensors can record position and orientation data at different points on the object. The controller can use a sensor data and a delta value to correct for compliance in the robotic system. The delta value can be based on the differences between the primary sensor and the at least one ancillary sensor. The compliance correction can be applied to poses of the object to modify the trajectory of the object for more accurate movements.

29 Claims, 16 Drawing Sheets

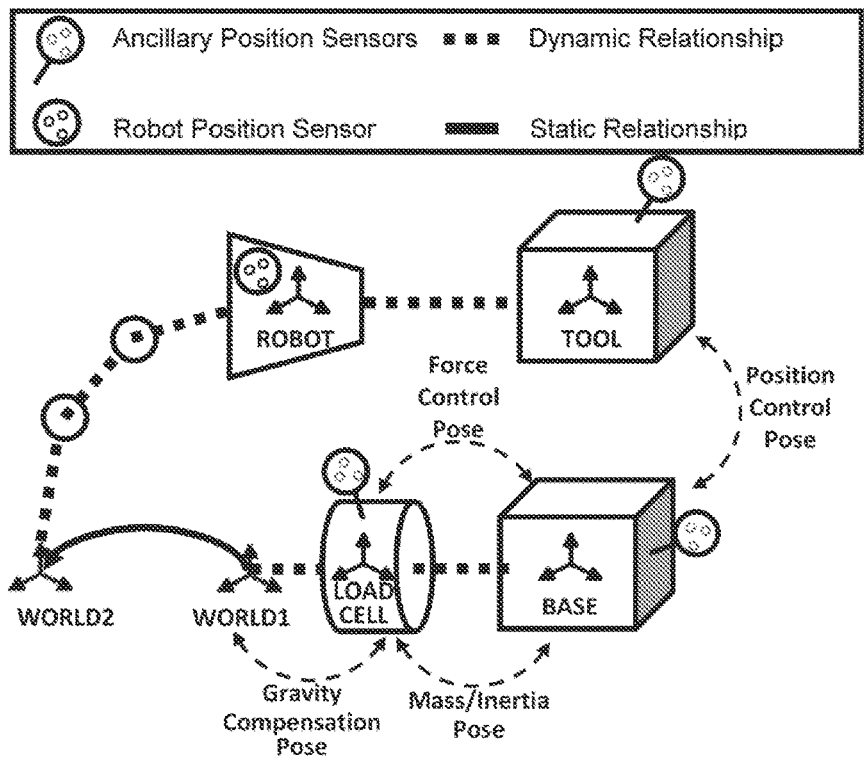
(A) LOAD CELL MOUNTED TO BASE
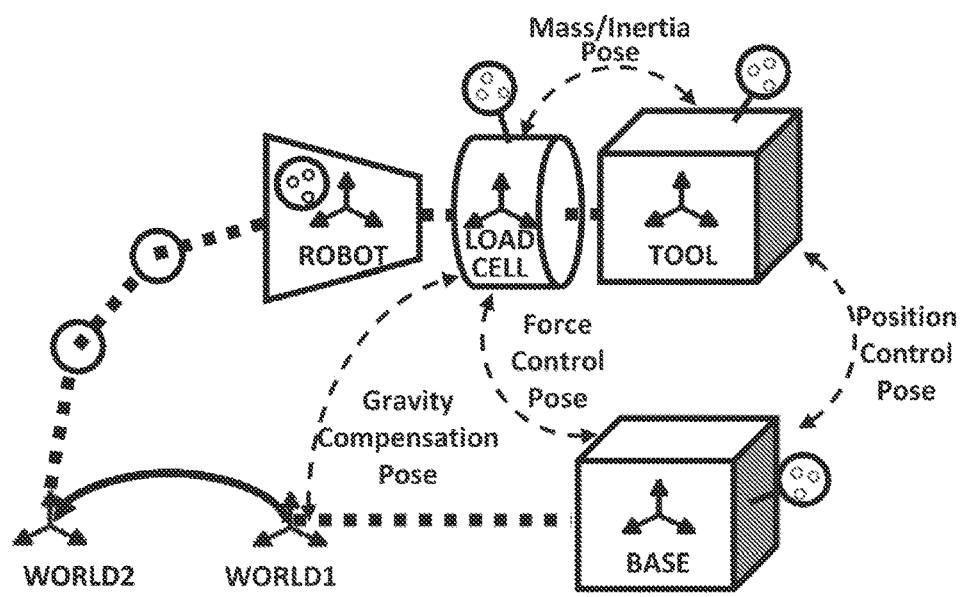
(B) LOAD CELL MOUNTED BETWEEN ROBOT AND TOOL
FIG. 6

```
202  RETRIEVE AN OBJECT PROFILE
```

```
SAMPLE THE PRIMARY SENSOR TO RECEIVE POSITION AND ORIENTATION
                              DATA
204
```

```
206  SAMPLE THE ANCILLARY SENSOR TO RECEIVE POSITION AND
                        ORIENTATION DATA
```

```
DETERMINE A DELTA VALUE REPRESENTING AN AMOUNT OF DEVIATION
   BETWEEN AN INITIAL STATIC POSITION AND ORIENTATION OF THE
 PRIMARY SENSOR AND AN ESTIMATED POSITION AND ORIENTATION OF
                THE PRIMARY SENSOR AT THE TIME
208
```

```
MODIFY THE TRAJECTORY OF THE OBJECT BASED ON THE DELTA VALUE,
 THE POSITION AND ORIENTATION DATA OF THE PRIMARY SENSOR, AND A
  STATIC RELATIONSHIP BETWEEN THE PRIMARY SENSOR AND A POINT ON
                           THE OBJECT
210
```

FIG. 10

```
                    ┌─────────────────────────────────────────────────────────┐
                    │ ESTABLISH THE COORDINATE SYSTEM WHERE AN INITIAL POSITION AND │
                    │    ORIENTATION OF A POINT ON THE OBJECT IS KNOWN IN THE │
                    │ 302                   COORDINATE SYSTEM                 │
                    └─────────────────────────────────────────────────────────┘
                                              │
                                              ▼
                    ┌─────────────────────────────────────────────────────────┐
                    │  RECEIVE INITIAL POSITION AND ORIENTATION DATA FROM THE PRIMARY │
                    │                        SENSOR                           │
                    │ 304                                                     │
                    └─────────────────────────────────────────────────────────┘
                                              │
                                              ▼
                    ┌─────────────────────────────────────────────────────────┐
                    │  DETERMINE THE STATIC RELATIONSHIP BETWEEN THE PRIMARY SENSOR │
                    │                     AND THE OBJECT                      │
                    │ 306                                                     │
                    └─────────────────────────────────────────────────────────┘
                                              │
                                              ▼
                    ┌─────────────────────────────────────────────────────────┐
                    │   RECEIVE INITIAL POSITION AND ORIENTATION DATA FROM THE │
                    │                    ANCILLARY SENSOR                     │
                    │ 308                                                     │
                    └─────────────────────────────────────────────────────────┘
                                              │
                                              ▼
                    ┌─────────────────────────────────────────────────────────┐
                    │   DETERMINE A STATIC RELATIONSHIP BETWEEN THE AT LEAST ONE │
                    │            ANCILLARY SENSOR AND THE OBJECT              │
                    │ 310                                                     │
                    └─────────────────────────────────────────────────────────┘
                                              │
                                              ▼
                    ┌─────────────────────────────────────────────────────────┐
                    │   DETERMINE THE STATIC RELATIONSHIP BETWEEN THE ANCILLARY │
                    │            SENSOR AND THE PRIMARY SENSOR                │
                    │ 312                                                     │
                    └─────────────────────────────────────────────────────────┘
```

FIG. 11

COMPLIANCE CORRECTION IN A ROBOTIC SYSTEM

CROSS-REFERENCE TO RELATED APPLICATIONS

This application is a continuation of U.S. application Ser. No. 17/157,237, filed Jan. 25, 2021, entitled COMPLIANCE CORRECTION IN A ROBOTIC SYSTEM, which claims the benefit of U.S. Provisional Application No. 62/965,328, filed 24 Jan. 2020, entitled DYNAMIC POSE CORRECTION OF COMPLIANT AND NON-RIGID CONNECTIONS IN ROBOTIC SYSTEMS, which are incorporated herein by reference in their entirety.

TECHNICAL FIELD

The present disclosure relates generally to improvements in robotic system control and movement and, more specifically, to systems and methods for correcting for compliance in a robotic system.

BACKGROUND

A robot is a machine that can automate complex tasks according to a predefined set of coded instructions and information input by a user. While robots can automate many such tasks, robots remain limited in situations where the environment surrounding the robot changes, the task is too complex, or the instructions do not correctly account for real world factors. Traditionally, a robot's predefined set of coded instructions are based on certain assumptions that are not necessarily true in the real world, but help to simplify the control process. Such assumptions can include, for example, an assumption that the environment will remain unchanged, an assumption that certain parts of the robot and/or robotic system are rigid and the positions reported by sensors are correct, and an assumption that the robot's tasks are generally limited to only a certain type of control at a time. Because the mechanical linkages in robots are not actually entirely rigid, have some amount of compliance, and the object mounted to the robot can also have compliance, the positions reported by the robot are rarely 100% accurate. Traditional industrial robot usage ignores the compliance in all the connections and does not allow for non-rigid connections, therefore constraining robot users and system developers to make every connection as rigid as possible and live with incorrect position and force poses.

Additionally, traditional robots function in highly unconstrained environments and changes in environments can lead to failure to complete a task or severe damage to the robot or an object associated with the task. Robot users have attempted to remedy this issue by including additional working components to robots, using additional position sensors, and switching between force and position control depending on the assigned task. However, current remedies are not effective in all scenarios and are highly specific to the environment and task of the robot.

SUMMARY

The present disclosure provides better control of a robot. Specifically, described herein are systems and methods for correcting for compliance in a robotic system.

In one aspect, the present disclosure includes a system comprising an object configured to be moved by a robotic system, and a primary sensor positioned on the object and at least one ancillary sensor positioned on the object, both configured to record position and orientation data. The system also includes a controller comprising a non-transitory memory storing executable instructions and a processor executing the instructions to complete the following steps. Retrieve a trajectory of the object, wherein the trajectory is a path between a first location in space and a second location in space. When the object is at a point on the trajectory: sample the primary sensor to receive position and orientation data of the primary sensor in a coordinate system at a time, sample the at least one ancillary sensor to receive position and orientation data of the at least one ancillary sensor in the coordinate system at the time, determine a delta value representing an amount of deviation between an initial static position and orientation of the primary sensor and an estimated position and orientation of the primary sensor at the time, wherein the amount of deviation is based on the position and orientation data of the primary sensor at the time, the position and orientation data of the at least one ancillary sensor at the time, and a static relationship between the primary sensor and the at least one ancillary sensor; and modify the trajectory of the object based on the delta value, the position and orientation data of the primary sensor at the time, and a static relationship between the initial static position and orientation of the primary sensor and an initial static position and orientation of a point on the object.

In another aspect, the present disclosure includes a method for controlling movement of an object including the following steps. Retrieving, by a controller comprising a processor, a trajectory of the object configured to be moved by a robotic system controlled by the processor, wherein the trajectory is a path between a first location in space to a second location in space. Sampling, by the controller, a primary sensor to receive position and orientation data of the primary sensor in a coordinate system at a time, wherein the primary sensor is positioned at a first location on the object and is configured to record the position and orientation data. Sampling, by the controller, at least one ancillary sensor to receive position and orientation data of the at least one ancillary sensor in the coordinate system at the time, wherein each of the at least one ancillary sensor is positioned at a unique location on the object and configured to record position and orientation data. Determining, by the controller, a delta value representing an amount of deviation between an initial static position and orientation of the primary sensor and an estimated position and orientation of the primary sensor at the time based on the position orientation data of the primary sensor at the time, the position and orientation data of the at least one ancillary sensor at the time, and a static relationship between the primary sensor and the at least one ancillary sensor. And, modifying, by the controller, the trajectory of the object based on the delta value, the position and orientation data of the primary sensor at the time, and a static relationship between the initial static position of the primary sensor and an initial static position and orientation of a point on the object.

BRIEF DESCRIPTION OF THE DRAWINGS

The foregoing and other features of the present disclosure will become apparent to those skilled in the art to which the present disclosure relates upon reading the following description with reference to the accompanying drawings, in which:

FIG. 6 shows diagrams of a robotic system with a load cell at different mounting positions;

FIGS. 10 and 11 are process flow diagrams illustrating methods for dynamic pose correction;

DETAILED DESCRIPTION

I. Definitions

Figure 1:
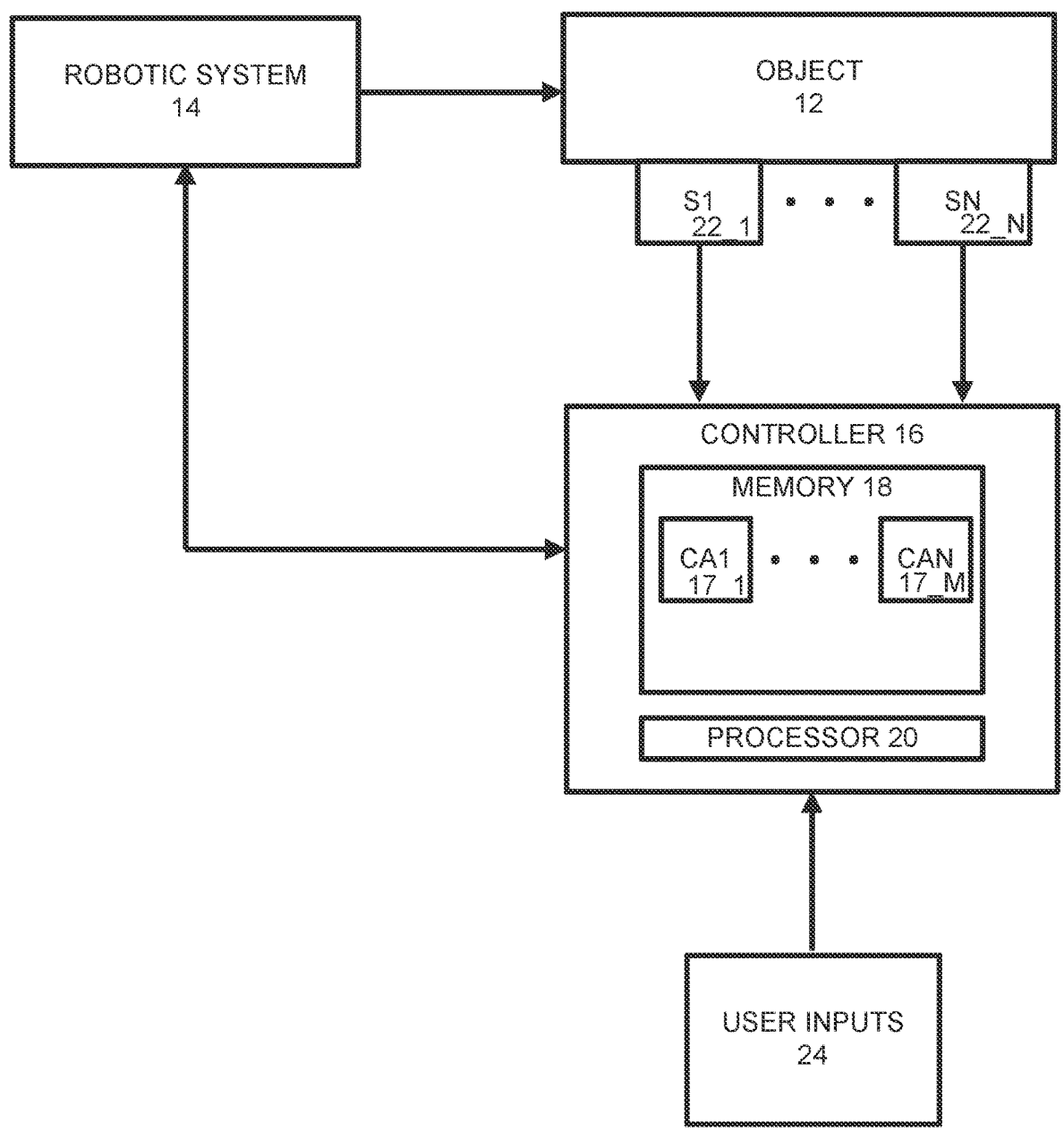
FIG. 1 is a diagram illustrating a system designed to provide improved control a robotic system.

In the context of the present disclosure, the singular forms "a," "an" and "the" can also include the plural forms, unless the context clearly indicates otherwise.

The terms "comprises" and/or "comprising," as used herein, can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

Additionally, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "robotic system" refers to a robot and additional components associated with the robot that interact with a surrounding environment. Additional components of the robotic system can include a tool, a base, a load and/or a load cell. The robot and additional components of the robotic system may have unique reference frames and/or coordinate systems.

As used herein, the term "robot" refers to a machine that can be used to automate a process. For example, the robot can include a mechanical construction, one or more electrical components to power and control at least a portion of the mechanical construction, and some level of computer programming code for controlling the mechanical construction and one or more electrical components. A robot is generally considered to have its own reference frame and/or coordinate system As used herein, the term "object" refers to a solid or semi-solid body that is associated with the robotic system that is moveable by the robotic system. The object can be a tool, a base, a load, a load cell, and/or a portion of the robot itself (e.g., its end effector). In some instances, the object can be a rigid body that experiences a small or negligible amount of deformation that is traditionally assumed to be zero. In other instances, the object can be a deformable body that experiences greater amounts of deformation that are not traditionally ignored.

As used herein, the term "trajectory" refers to a predefined path or curve for an object to follow as it moves from a starting location in space to an end location in space. If the object is being moved by the robot, then the trajectory is often computed in the reference frame and/or coordinate system of the robot.

As used herein, the term "pose" refers to a position and orientation of an object. Pose and position and orientation may be used interchangeably throughout.

As used herein, the terms "force" and "forces" refer to any interaction that, when unopposed, will change the motion of an object. Forces can include, but are not limited to, tensions, compression, thrust, drag, gravity, pressure, torque, and stress. More than one type of force can be associated with an object at a time.

As used herein, the term "sensor" refers to a device that detects or measures a physical property (e.g., position, motion, force, torque, etc.) and records, indicates, or otherwise responds to the physical property. A sensor can include a component for transmitting the detected or measured property as data. Sensors can include force sensors, position sensors, combined force and position sensors, or the like.

As used herein, the terms "coordinate system" and "reference frame" refer to an arrangement of reference lines or curves used to identify a location of lines in space. Different parts of a robotic system (e.g., robot, tool, base, load, etc.) can each define associated space with a unique coordinate system from the viewpoint of the associated part of the robotic system.

As used herein, the term "common reference frame" refers to an abstract coordinate system and set of reference points that standardizes measurements in different coordinate systems. Each unique coordinate system can be transformed into the common reference frame by a unique transform. In some instances, the common reference frame can be one of the reference frames associated with the robotic system.

As used herein, the term "control law" can refer to one or more mathematical formulae used by a control system to command, manage, direct, or regulate the behavior of another device, such as a robot. Control laws can be used singularly or combination to produce a control signal based on another signal (e.g., positive feedback, negative feedback, etc.) and one or more control variables. The output of the control law is a signal that is passed to the robot to cause it to move based on the difference between desired values and actual values (e.g., sensor data). For example, a PID controller combines three control laws where one control variable scales the present value of the error, another control variable scales the integral of the error, and a third control variable scales the derivative of the error. These scaled terms can then be fed back to the system to change the signal.

As used herein, the term "adaptive" refers to something that is characterized by or given to change.

As used herein, the term "adaptive compensation" refers to various methods that account for uncertainties and changes that are introduced into a control system as the uncertainties and changes are introduced.

As used herein, the term "profile" refers to the desired position and force values to be applied to the object over time. The profile can also contain time varying values for the hybrid weighting value, force control law parameters, position control law parameters, adaptive compensation parameters, additional actuator parameters, and system parameters. The proposed trajectory of the at least one object is the desired position portion of the profile.

II. Overview

Users of robots have learned to live with the robots providing incorrect position and force poses and/or having a poor ability to switch between force of position control. The predefined set of coded instructions that the robot uses to move the objects often relies on certain assumptions that are not necessarily true in the real world (e.g., an environment will remain unchanged, the environment is unconstrained, certain parts of the robotic system are rigid, positions reported by sensors are correct, that a robot's tasks are generally limited to only a certain type of control at a time, or the like). Robot users have thought of a number of ways to attempt to remedy these issues, including adding additional working components to robots, using additional position sensors to locate obstacles, and switching between force and position control depending on the assigned task. However, current remedies are not effective in all scenarios and are still highly specific to the environment and task of the robot. The systems and methods of the present disclosure can solve the problems inherent to traditional robots. The following systems and methods can be used to correct for compliance inherent and developed in a robotic system and to modify the control components of robotic system to create a robotic system that can operate more effectively and accurately in any type of environment.

III. Robotic Control System

One aspect of the present disclosure can include a robotic control system that can self-correct for inherent and added compliance and for movement in an unconstrained environment, as shown in FIG. 1. The corrections can modify a trajectory of the robot such that the robotic control system can be utilized to increase the tasks a robot can competently complete in a myriad of environments, including, but not limited to: research, industrial, and medical environments. The system 10 can include at least one object 12 that can be moved by a robotic system 14. The robotic system 14 can be controlled by a controller 16 that includes at least a non-transitory memory 18 and a processor 20. The non-transitory memory 18 can receive data from one or more sensors (S1 22_1-SN 22_N, where N is an integer greater than 1) and user inputs 24. The one or more sensors (S1 22_1-SN 22_N) can be positioned at locations on the at least one object 12 to record data about the object 12. The one or more sensors can be, but are not limited to, a force sensor, a position sensor, a velocity sensor, a friction sensor, and/or a pressure sensor. It should be noted that the one or more sensors can be any type of sensor commonly used for determining a property of interest. Additionally, the non-transitory memory 18 can receive and/or store a profile for at least one application of the robotic system 14 and the object 12. At least a portion of the profile can be input to the controller 16 and/or to the system 10 generally as one or more user inputs 24.

The controller 16 can be coupled to the robotic system 14 and/or the one or more sensors 22_1-22_N. In some instances, the coupling between the controller 16 and the robotic system 14 and/or the coupling between the controller 16 and the one or more sensors 22_1-22_N can be via a wired connection. In other instances, the coupling between the controller 16 and the robotic system 14 and/or the coupling between the controller 16 and the one or more sensors 22 can be via a wireless connection. In still other instances, the coupling between the controller 16 and the robotic system 14 and/or the coupling between the controller 16 and the one or more sensors 16 can be via a connection that is both wired and wireless. Similarly, in some instances, the one or more sensors 22_1-22_N can be coupled to the robotic system 14 according to a wireless connection and/or a wired connection. Additionally, each element of the system 10 may have additional components to aid in the coupling that are not illustrated.

The controller 16 can include at least the non-transitory memory 18 and the processor 20. The non-transitory memory 18 can store machine executable instructions, which are executable by the processor 20. For example, the machine executable instructions can include a plurality of control algorithms (CA 17_1-CA 17_M, where M is an integer not necessarily equal to N). In some instances, the non-transitory memory 18 and the processor 20 can be combined in a single hardware element (e.g., a microprocessor), but in other instances, the non-transitory memory 18 and the processor 20 can include at least partially distinct hardware elements.

The plurality of control algorithms (CA 17_1-CA 17_M) can control the actions of the robotic system 14. One of the plurality of control algorithms (CA 17_1-CA 17_M) can be an algorithm for dynamic pose correction and another of the plurality of control algorithms can be an algorithm for hybrid force and/or position control of the robotic system 14. The dynamic pose correction algorithm can correct for compliance detected in the robotic system 14 and/or the object 12. The hybrid force and/or position control algorithm can effectively switch the method of control of the robotic system 14 between force control, position control, and a combination of force and position control in real time depending on the environment of the robotic system. These algorithms can be combined with traditional robotic control algorithms known to a person of ordinary skill in the art to cause movement in the robotic system 14 and/or the object 12.

Figure 2:
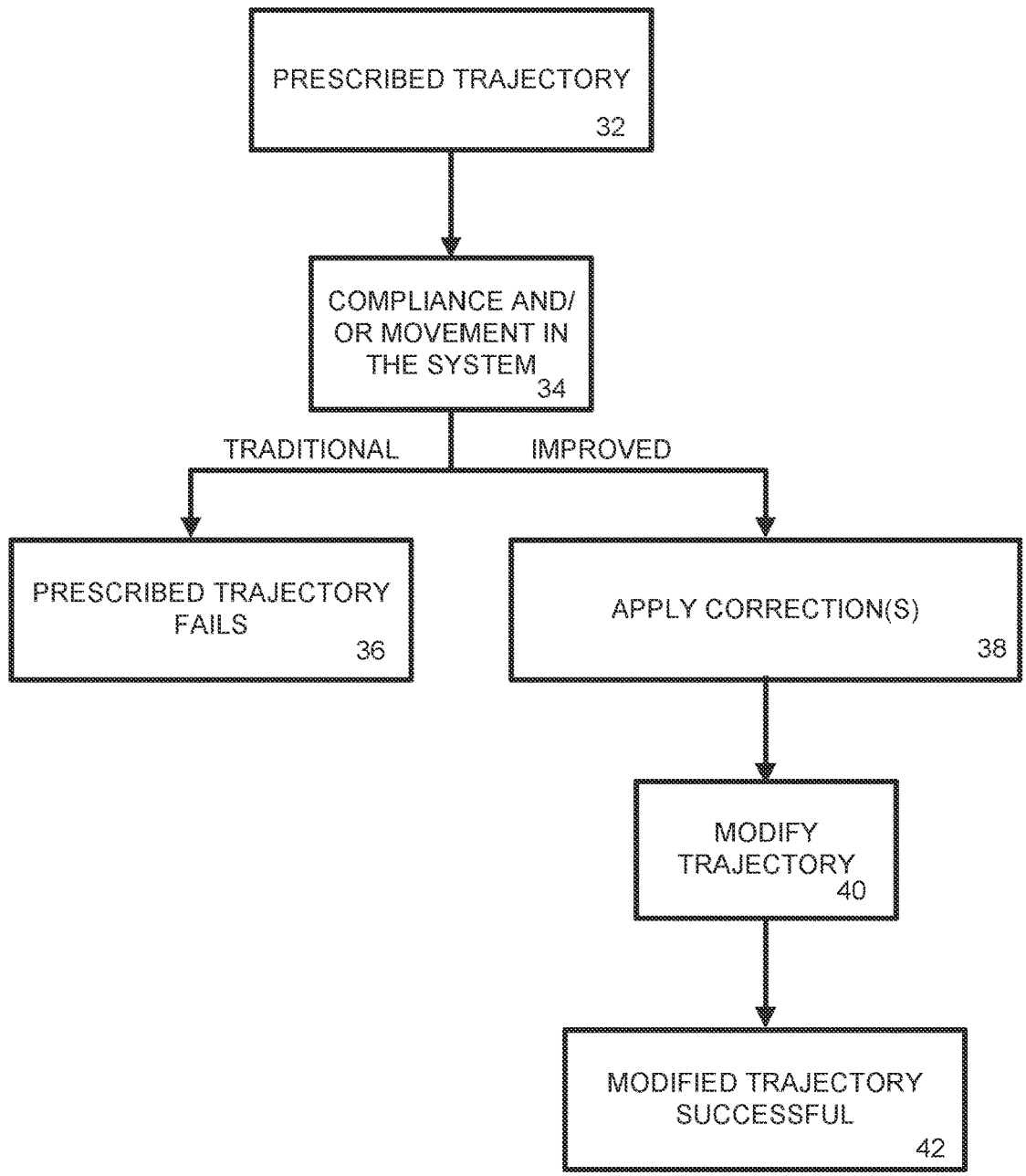
FIG. 2 is a diagram illustrating advantages of the system as shown in FIG. 1 compared to a traditional system in control of the robotic system.

As shown in FIG. 2, the controller 16 can generate or retrieve a prescribed trajectory 32 based on the difference between an actual pose of the at least one object 12 and the actual forces acting on the at least one object 12 at a first time and a desired pose of the at least one object 12 and a desired force to act on the at least one object 12 at a second time. As the robotic system 14 moves the at least one object 12 along the prescribed trajectory compliance 34 can creep into what were originally assumed to be rigid (and therefore non-changing) connections between components of the robotic system 14 and/or the at least one object 12. Additionally, excess and unplanned movements can enter parts of the system 10 or the system's environment can change, thereby causing the prescribed trajectory 32 to become unachievable. If a traditional robotic control system is utilized (the path labeled TRADITIONAL) the prescribed trajectory will fail 36 because of these unexpected and/or unaccounted for variables. If the control system 10 utilizes corrections stored in controller 16, the corrections can be applied 38 to the trajectory as the at least one object 12 moves. The applied corrections 38 can continually modify the trajectory (the path labeled IMPROVED) so that the object successfully reaches the desired pose at the desired forces by applying correction(s) 38 and modifying the trajectory 40 so that the modified trajectory is successful 42.

Figure 3:
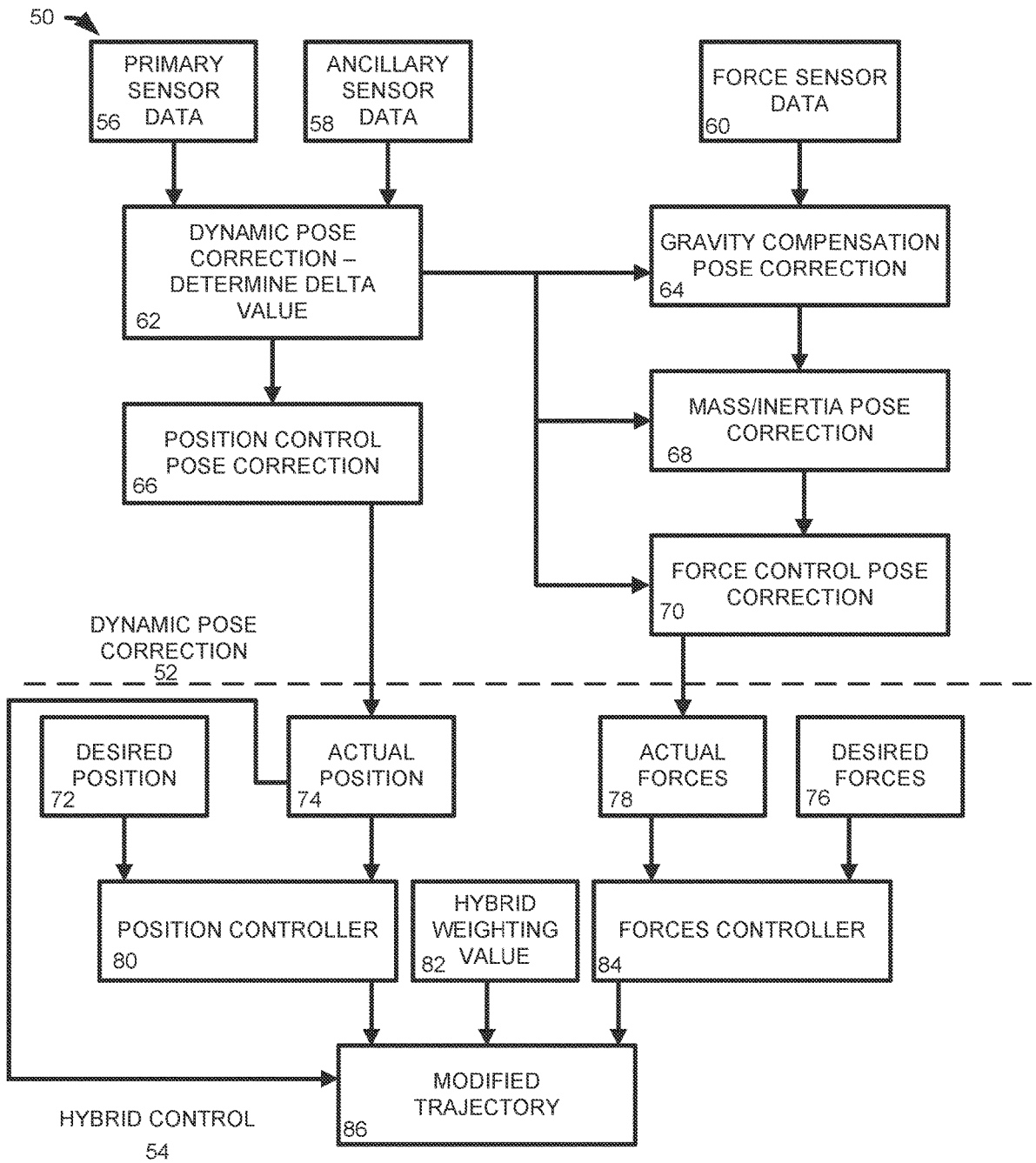
FIG. 3 is a diagram of dynamic pose correction and hybrid control that can be implemented by the system of FIG. 1 to achieve the improved results of FIG. 2.

For example, when writing on a chalk board a traditionally controlled robot may be able to write legibly assuming the exact position and/or plane in space where the chalkboard and the tip of the chalk meet is known, and the robot and the chalk are connected in a completely rigid manner. If the known position and/or plane is a little off the piece of chalk can be crushed into the board or be too far away to write anything. If the connection between the chalk and the robot is not entirely rigid the writing may not be legible (e.g., shaky). Additionally, if the chalk is consumed while writing the known position and/or plane would then be inaccurate, and the position of the robot would need to be changed to allow the chalk to write. The position of the robot required while the chalk writes would therefore vary based on the quantity of chalk consumed. The same would also be true if the chalk board moved (e.g., compliance in the board, compliance in the wall or stand the board is mounted to, etc.). The system 10 of FIG. 1 can correct for each of these complications using dynamic pose correction and hybrid force and/or position control. An example of the dynamic pose correction 52 and the hybrid control 54 that may be implemented by the system 10 is shown in FIG. 3.

The control system 10 can apply dynamic pose correction 52 to determine the actual positions and forces needed to effectively control the robotic system 14 with hybrid force and/or position control (hybrid control) 54 to modify a trajectory of the at least one object 12 to be moved by the robotic system 14 and the velocity at which that movement will occur. During dynamic pose correction, pose data from a primary sensor 56 and pose data from at least one ancillary sensor 58 are utilized to determine a delta value 62 (or correction value) to correct for compliance in the system. The delta value 62 can be applied to the pose data for position control pose correction 66 to determine the actual position 74 of the at least one object 12 at a time. The delta value 62 can also be applied to force sensor data 60 to make corrections in a gravity compensation pose 64, a mass/inertia pose 68, and a force control pose 70 in order to determine the actual forces 78 associated with the at least one object 12 at a time. The determined actual position data 74 can be combined with the desired position 72 within a position controller 80 (e.g., a PID-FF-DB controller) to determine a position control output at the time. The determined actual force data 78 can also be combined with the desired forces 76 within a forces controller 84 (e.g., a PID-FF-DB controller) to determine a forces control output. The desired position 72, the desired forces 78, and a hybrid weighting value 82 can be input into the control system 10 as part of a profile (e.g., by user input, by a control loop, by adaptive learning indicating the amount of position and/or force control required at the time). The hybrid weighting value 82 can vary in real time based on changes to the system 10 or the environment of the system. The position control output from the position controller 80, the force control output from the forces controller 84, and the hybrid weighting value 82 can be combined to modify 88 the trajectory of the at least one object 12 such that the actual movement of the at least one object 12 can account both for compliance and changes in the system and the environment of the system.

A control system may not always need to correct for compliance and for changes in a system and the environment of the system. Indeed, dynamic pose correction and hybrid force and/or position control can be implemented together, as discussed previously, or implemented separately, as will be discussed subsequently.

III. Dynamic Pose Correction

Figure 4:
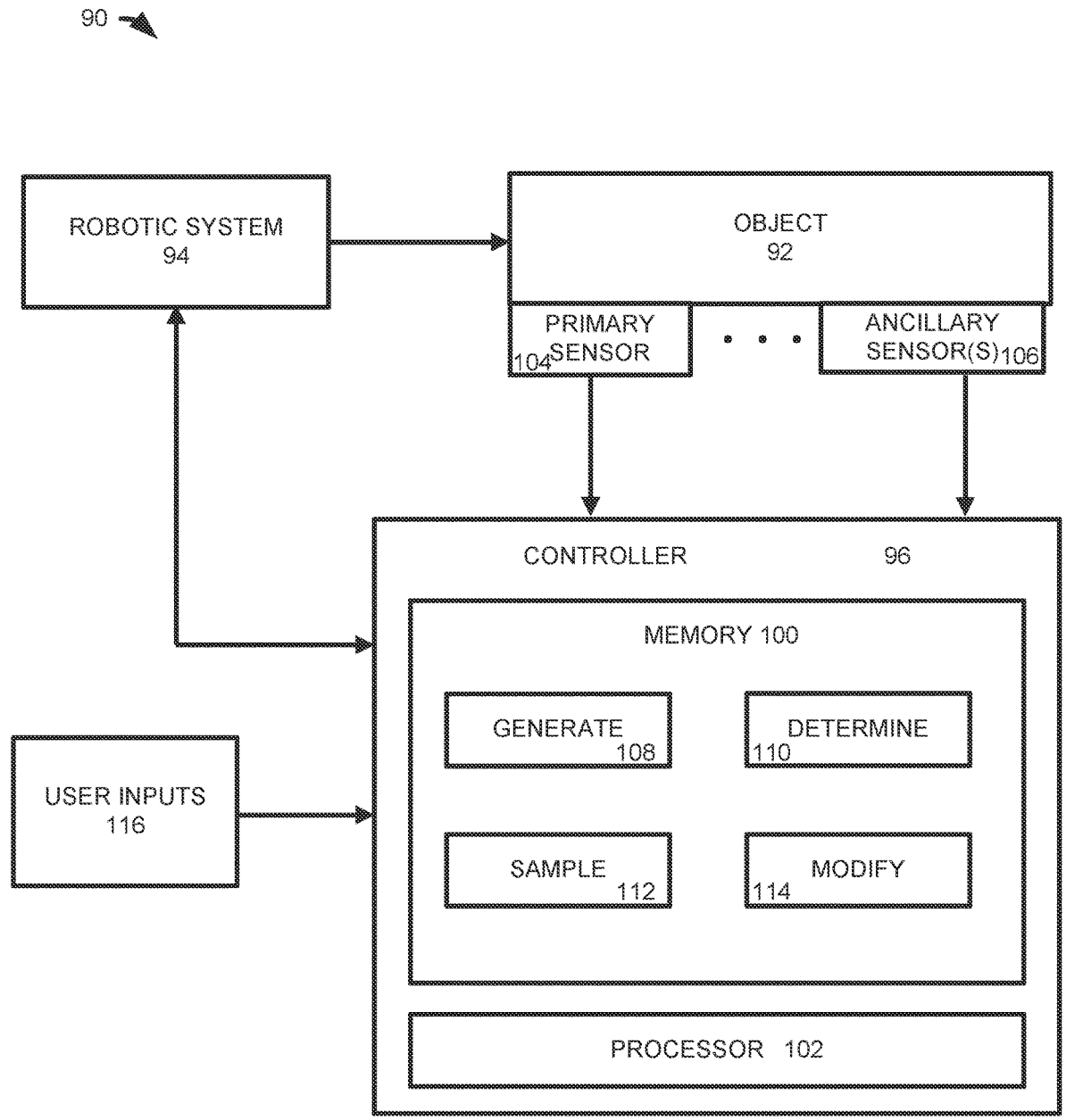
FIG. 4 is a diagram illustrating a system that controls a robotic system by implementing dynamic pose correction.

Dynamic pose correction is one example of a control algorithm (CA1 17_1-CAN 17_N). As shown in FIG. 4, a system 90 (which may be embodied within robotic system 94) can be capable of correcting for compliance within a robotic system in real time. The system 90 can include an object 92 that can be moved by a robotic system 94 (e.g., in from 1 degree of freedom (DOF)-6DOF). The robotic system 94 can be controlled by a controller 96 comprising a non-transitory memory 100 and a processor 102 in response to data deceived from a primary sensor 104, at least one ancillary sensor 106, and user inputs 116 (e.g., which can be used to input at least a portion of a profile). The primary sensor 104 can be a position sensor. The at least one ancillary sensor 106 can be a position sensor. The primary sensor 104 can be positioned at a first location on the object 92 and can record position and orientation data. The at least one ancillary sensor 106 can each be positioned at a unique location on the object 92 and can record position and orientation data.

The controller 96 can be coupled to the robotic system 94 and/or the primary sensor 104 and the at least one ancillary sensor 106. In some instances, the coupling between the controller 96 and the robotic system 94 and/or the coupling between the controller 96 and the primary sensor 104 and/or the at least one ancillary sensor 106 can be via a wired connection. In other instances, the coupling between controller 96 and the robotic system 94 and/or the coupling between the controller 96 and the primary sensor 104 and/or the at least one ancillary sensor 106 can be via a wireless connection. In still other instances, the coupling between the controller 96 and the robotic system 94 and/or the coupling between the controller 96 and the primary sensor 104 and/or the at least one ancillary sensor 106 can be via a connection that is both wired and wireless. Similarly, in some instances, the primary sensor 104 and the at least one ancillary sensor 106 can be coupled to the robotic system 94 according to a wireless connection and/or a wired connection. Additionally, each element of the system 90 may have additional components to aid in the coupling that are not illustrated.

The controller 96 can include at least the non-transitory memory 100 and the processor 102. The non-transitory memory 100 can store machine executable instructions, which are executable by the processor 102 (e.g., generate a trajectory 108 (and/or retrieve one or more components of the trajectory), sample a sensor 112, determine a delta (correction) value 110, modify a trajectory 114, etc.). In some instances, the non-transitory memory 100 and the processor 102 can be combined in a single hardware element (e.g., a microprocessor), but in other instances, the non-transitory memory 100 and the processor 102 can include at least partially distinct hardware elements.

The controller 96 can generate a trajectory of the object 92, wherein the trajectory is a path between a first location in space and a second location in space that the object 92 is to move along. The trajectory, and a velocity at which the object 92 should move along the trajectory, can be generated based on the desired position and the desired forces, which may be retrieved from at least a part of the profile. In some instances, the trajectory can be retrieved directly from at least a part of the profile (e.g., a prescribed profile). The controller 96 can generate a single trajectory and/or multiple trajectories simultaneously (e.g., moving more than one part of an object at the same time-like pulling tendons in foot or knee) and/or consecutively (e.g., writing on a chalk board, or mimicking a portion of a gait). The trajectory can be for movement in between one to six degrees of freedom (DOF). When the object 92 is at a point on the trajectory the controller 96 can sample the primary sensor 104 to receive position and orientation data of the primary sensor in a coordinate system at a time and sample the at least one ancillary sensor 106 to receive position and orientation data of the at least one ancillary sensor in the coordinate system at the time. The sampling can be done automatically at a sampling frequency or manually based on user inquiries. After sampling the primary sensor 104 and the at least one ancillary sensor 106 the controller can determine a delta value representing an amount of deviation between an initial static position and orientation of the primary sensor relative to the object and an estimated position and orientation of the primary sensor relative to the object at the time. The amount of deviation can be based on the position and orientation data of the primary sensor 104 at the time, the position and orientation data of the at least one ancillary sensor 106 at the time, and a static relationship between the primary sensor and the at least one ancillary sensor. The trajectory of the object 92 can then be modified based on the delta value, the position and orientation data of the primary sensor 104 at the time, and a static relationship between the initial static position and orientation of the primary sensor and an initial static position and orientation of a point on the object.

Before the object 92 moves and/or before a trajectory is retrieved and/or generated, the controller 96 can execute a number of commands. The controller 96 can establish a coordinate system to use as a common reference frame for data from the sensors 104 and 106 and other sources (e.g., user input data such as at least a part of the profile, data from other sensors, etc.). An initial position and orientation of a point on the object 92 can be known within the coordinate system, the point can be used as a reference for the position and orientation of the object 92. Optionally, more than one point can be known on the object 92. The controller 96 can also receive initial position and orientation data of the primary sensor 104 in the coordinate system from the primary sensor and initial position and orientation data of the at least one ancillary sensor 106 in the coordinate system from the at least one ancillary sensor. Optionally the initial position and orientation data of the primary sensor 104 and/or the at least one ancillary sensor 106 can be transformed into the coordinate system if it is detected in another coordinate system. The controller 96 can determine the static relationship between the primary sensor 104 and the object 92 based on the initial position and orientation data of the primary sensor and the known initial position and orientation of the point on the object. The controller 96 can determine a static relationship between the at least one ancillary sensor 106 and the object 92 based on the initial position and orientation data of the at least one ancillary sensor and the known initial position and orientation of the point on the object. Based on the static relationship between the at least one ancillary sensor 106 and the object 92 and the static relationship between the primary sensor 104 and the object the controller 96 can determine the static relationship between the at least one ancillary sensor and the primary sensor. It should be noted that the above determinations are only one way that the static relationships can be determined and that a person having ordinary skill in the art could determine the above static relationships in other ways that are obvious based on the initial information available. Other methods are omitted for brevity and conciseness.

The initial position and orientation data of the primary sensor 104, the initial position and orientation data of the at least one ancillary sensor 106, the point on the object 92, the delta value, the position and orientation data of the primary sensor at the time, and the position and orientation data of the at least one ancillary sensor at the time can all be represented as homogenous 4×4 transformation matrices and/or as quaternions. The matrices and/or quaternions include a rotational component that describes the orientation of one part of the system with respect to another and a translational component that describes the position that describes the position of one part of the system with respect to another. The 4×4 matrices and/or quaternions represent three-dimensional data. Other sizes of matrices may be used for movement in a different number of dimensions.

The object 92 may be more than one object and may be coupled with and/or a part of the robotic system 94. If the object 92 is a part of the robotic system 94 it may be a tool within the robotic system or a base within the robotic system. The robotic system 94 can include for example: a robot, a tool, a base, and/or a load cell. The load cell is an example of a force sensor. The object 92 may also be fixed to the robotic system 94 (e.g., by at least one clamp). The object 92 fixed to the robotic system 94 can be, but is not limited to, a cadaveric knee, foot, spine, etc.; a polishing wheel; or a piece of chalk. The object 92 can be a rigid body or a deformable body. A rigid body is a solid body in which deformation is zero or so small it is traditionally neglected (e.g., the distance between any two given points on a rigid body remains constant regardless of external forces or moments exerted on the rigid body). When rigid bodies are combined the small amounts of deformation can compound to become problematic to successful robotic control. A deformable body is a body that changes its shape and/or volume while being acted upon by any kind of external force. For example, a system of rigid bodies with non-rigid connections is an example of a deformable body.

The object 92 can be moved by rotation and/or translation in as many as 6 DOF when moved by the robotic system 94. The primary sensor 104 and the at least one ancillary sensor 106 can be motion tracking sensors (e.g., optical sensors) in order to track the rotation(s) and/or translation(s) of the object 92. The primary sensor 104 can also be a part of the robotic system 94. The object 92 may move in more degrees of freedom or fewer degrees of freedom depending on the task the robotic system 94 is programmed to complete and/or the specifications of the robotic system (e.g., its capability to move in a number of DOF). When the corrections for compliance are implemented and the trajectory of the object 92 is modified the modifications can be in between one to six degrees of freedom, depending on what compliance was detected in the robotic system 94 and/or the object 92. Compliance corrections can be applied to one of a plurality of poses including a position control pose, a gravity compensation pose, a force control pose, and an inertia/mass control pose. Applying compliance corrections to at least one of the gravity compensation pose, the force control pose, and the inertia/mass control pose can account for compliance in force measurements as well. Accounting for compliance in both position and force measurements makes all modifications to the trajectory, and therefore movement of the robotic system 94 and/or the object 92 more accurate.

Figure 5:
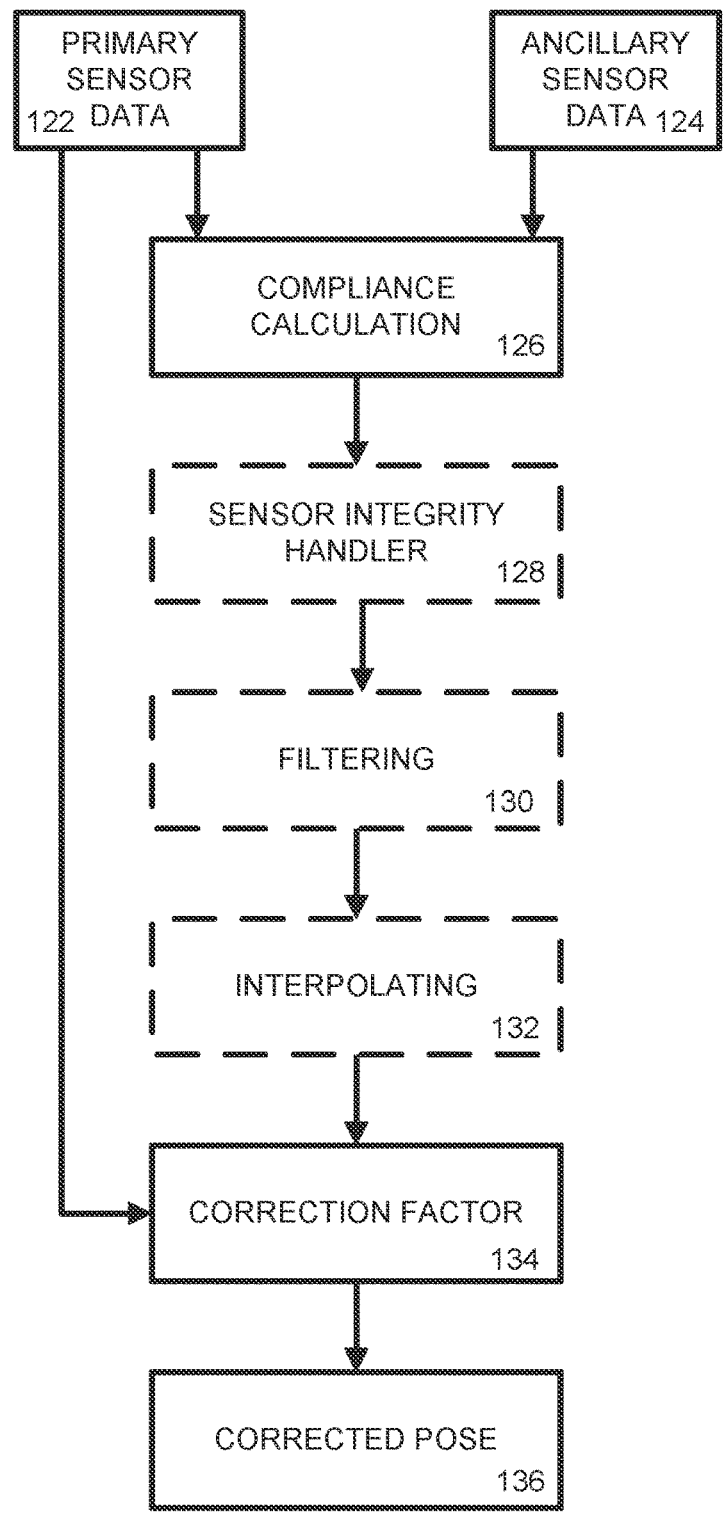
FIG. 5 is a diagram illustrating the control logic of dynamic pose correction that can be used by the system of FIG. 4.

As shown in the FIG. 5, and described in detail previously, a diagram 120 shows that data from the primary sensor 122 and data from the at least one ancillary sensor 124 can be input into a compliance calculation 126 of the controller to output a correction factor (delta value) 134. The correction factor 134 and the primary sensor data 122 can then be combined to correct at least one pose 136. If only pose data is corrected the position control pose is corrected. If force data is also collected (not shown in FIG. 5) the correction factor can be applied to the force data to correct the gravity compensation pose, the force control pose, and an inertia/mass control pose.

In some instances, the controller can further process the compliance calculation 126 before outputting the correction factor 134 using a sensor integrity handler 128, filtering 130, and/or interpolating 132. The controller can low pass filter the delta value and weight the delta value based on at least one of an accuracy, a proximity, a reliability, and a precision of the at least one ancillary sensor before correcting pose(s) 136 and modifying the trajectory of the object. The controller can also perform safety checks to keep the robotic system operating within a predetermined safe environment. These safety checks can include another filter that reduces the speed at which the robotic system responds to data with a change outside a predetermined threshold (e.g., an ancillary sensor that became visible again, an ancillary sensor reading of NaN or 0, etc.) These processing steps may occur in any order determined by a user with ordinary skill in the art.

When the at least one ancillary sensor includes two or more ancillary sensors the controller can determine separate delta values for each of the two or more ancillary sensor. The controller can low pass filter the separate delta values. The controller can then weight each of the two or more ancillary sensors based on an accuracy, proximity, reliability, and/or precision of each of the two or more ancillary sensors. The controller can then interpolate the separate delta values to determine the delta value used to correct the pose(s) and modify the trajectory of the object.

The sensory integrity handler 128 determines a level of confidence of the at least one ancillary sensor (e.g., accuracy, proximity, reliability, and/or precision) because generally ancillary sensors are not as consistent as a primary sensor. Generally ancillary sensors capture more noise than the primary sensor and can be occluded from view (e.g., when motion tracking sensors are used). However, ancillary sensors, especially optical sensors, have little or no mechanical compliance baked into their measurement and are therefore more accurate than the primary sensor, such as when the primary sensor is the robot. Because the delta value is calculated directly from the noisy and unreliable, but very accurate ancillary sensors, determining the integrity of the sensors is an important safety check. The parameters of the sensor integrity handler 128 can be predetermined and/or modified by a user. The sensor integrity handler 128 can account for missing data and/or ignore instantaneous changes in the data. When an ancillary sensor gives back NaNs or 0s the data is ignored and the last known good sensor data is used. This means that some quaternions that go into the quaternion weighted average calculation (described later) may be old. It also means that if a marker is occluded for example, control won't stop (e.g., if an ancillary sensor is occluded on the robot then the robot just remembers its last remembered position). The sensor integrity handler 128 can also ignore instantaneous changes (for example after digitization and/or when starting a new trajectory after the object has sat and may have translated and/or rotated). The current delta value can be compared with the last delta value (or possibly an identity quaternion) and the safety check can be ignored for the first run of the control loop.

The controller can also filter data at filtering step 130 to remove excess noise from the compliance calculations 126. Filtering can be low pass filtering and/or Kalman filtering. Different filters can also be applied to healthy and/or unhealthy ancillary sensor data. Unhealthy ancillary sensor data can be due to an occluded ancillary sensor outputting NaNs or 0s, for example. The sensor integrity handler 128 can detect this senor is unhealthy and influence the filtering 130. For example, if receiving unhealthy ancillary sensor data, a scaling factor may be used such that the last known healthy ancillary sensor position will be heavily weighted. Once the ancillary sensor is healthy again the robot can only slowly transition to the new ancillary sensor's position because the last know healthy position is heavily weighted. After the ancillary sensor has been healthy for a sufficient amount of time a different scaling factor can be used to not heavily weight past positions, and allow for more rapid changes in robot motion. In one aspect, each of the pose and/or relationship matrices and/or quaternions can be filtered. In another aspect, each of the delta value matrices can be converted into a delta quaternion and then filtered based on the following equation:

$$\Delta(t)_i = \Delta(t)_i(1-\alpha) + \Delta(t-1)_i(\alpha)$$

Where:
$\Delta(t)_i$: the $i^{th}$ delta quaternion at time t
$\Delta(t-1)_i$: the $i^{th}$ delta matrix from the last control loop
$\alpha$: weighting factor The exponential nature of the equation means that all previous values are included in the next values and smoother data can be output. The following equation can also be used:

$$\alpha = \log_{1000}((SF*999)+1), SF \in \{0-1\}$$

Where the scaling factor (SF) is top weighted and the smoothing factor is between 0 and 0.9999.

The delta quaternions can generally be relatively constant because they are independent of robot motion. If the robot's position and the ancillary sensor data is 100% accurate then each delta quaternion will be an identity. It is only when there is compliance that the delta quaternions are anything but an identity. Compliance can be a function of robot motion, but does not have to be. This means that even if the robot is moving very fast, the delta value can still be relatively constant, and filtering will not miss any sudden kinematic changes. The controller can also interpolate and/or average the sensor data and delta quaternions at Interpolating 132. Interpolation at Interpolating 132 can be a quaternion weighted average, such as the Tolga Birdal equation. Weighted averaging of data from two or more ancillary sensors can result is more accurate and reliable correction factor 134 because data from one sensor may be compensated for by data from another sensor. Weights may be predetermined by a user or determined by the system 90 when dynamically set using a Kalman filter.

The placements and/or weights of the at least one ancillary sensor 106, and the primary sensor 104, on the object 92 and/or on the robotic system 94 and the equations used within the controller 96 can depend, in part, on the configurations of the robotic system.

The kinematic chains of two possible configurations of robotic systems are schematically shown in FIG. 6. At element (a), the kinematic chain for a robotic system with a load cell is mounted at the base is shown. At element (b), the kinematic chain for a robotic system with a load cell mounted to the end of the robot is shown. In element (b) the mass of the tool and the orientation in space can impact the loads measured by the load cell and gravity & inertia compensation must be employed to prevent gravity and inertia based errors from impacting the measurement of the loads between the tool and the base. In both (a) and (b), static relationships are shown with solid lines, dynamic relationships are shown with dashed lines, ancillary sensors are shown with a circle and a line shape, and the robot sensor (e.g., the primary sensor) is shown with a circle.

The robot, the tool, the base, and the load cell each have their own coordinate system, as well as one or two global and/or static WORLD coordinate systems. Connections between the various coordinate systems are represented with both solid and dashed lines. The solid line represents a relationship between coordinate systems that is static and will not change throughout a task. The dashed lines represent relationships between coordinate systems that may change throughout a task due to non-rigid connections and/or compliance. Traditional control methods treat all the dashed lines as if they are solid, static, and infinitely rigid connections. However, in practice they are not. The more these connections change throughout a task, the more incorrect the pose calculations will be. The system 90 allows these connections to dynamically change throughout a task and corrects for compliance through at least one ancillary sensor and, optionally, a sensor fusion algorithm. Traditional industrial robot use ignores the compliance in all the connections and does not allow for non-rigid connections and also constrains robot users and system developers to make every connection as rigid and possible and accept incorrect pose calculations; in contrast, the control described herein reduces uncertainty in Position Control, Force Control, Gravity Compensation, and Mass/Inertia Poses, which frees up robot developers to use robots in applications where rigid connections are not possible.

As shown in (a) and/or (b), WORLD 1 represents the global static coordinate system that the position of all ancillary sensors and other coordinate systems can be expressed in. WORLD 2 represents the static coordinate system of the robot where it is mounted and the robot's positions are reported relative to WORLD 2. ROBOT represents the actively dynamic coordinate system that is the position of the end of the robot. This is the only actuated portion of the system where commands will be sent to the robot to modify this position in space. To know where ROBOT is in space relative to WORLD 1, the coordinate transformation from WORLD 1 to WORLD 2 is required. LOAD CELL represents the coordinate system of the load cell. This is the sensor that measures loads (forces and torques). TOOL represents the coordinate system of the tool or object mounted to the end of the robot. BASE represents the coordinate system of the base or object mounted to the world that the tool is interacting with.

Position Control Pose represents the relative relationship between the TOOL and BASE is the coordinate system of interest for position control/measurement. Force Control Pose represents the relative relationship between the LOAD CELL and BASE, TOOL, or Position Control Pose is the spatial relationship required for force control/measurement. No matter where the load cell is mounted the load cell loads can be reported in the BASE coordinate system, the TOOL coordinate system, or some combination of the two (based on Position Control Pose). To make this transformation of loads the Force Control Pose is required. Gravity Compensation Pose represents the relative relationship between the LOAD CELL and the gravity vector for gravitational effect compensation of the mass attached to the load cell. Mass/Inertia Pose represents the relative relationship between the LOAD CELL and the attached object, either BASE or TOOL, used in calculating Center of Mass (CoM) and/or Moment of Inertia (MoI). These relationships are required inputs when performing gravity and/or inertial compensation. Ancillary Sensors represent the motion tracking sensors mounted to any object in the system are able to report the position in space of that object. These could track position, velocity, and/or acceleration. Robot Position Sensor represents the robot reports the position in space of the end of the arm. While an ancillary sensor can be mounted to the end of the robot, this sensor is not necessarily the same as an ancillary sensor because it is an inherent functionality of industrial robots that they can self-report their position.

Figure 7:
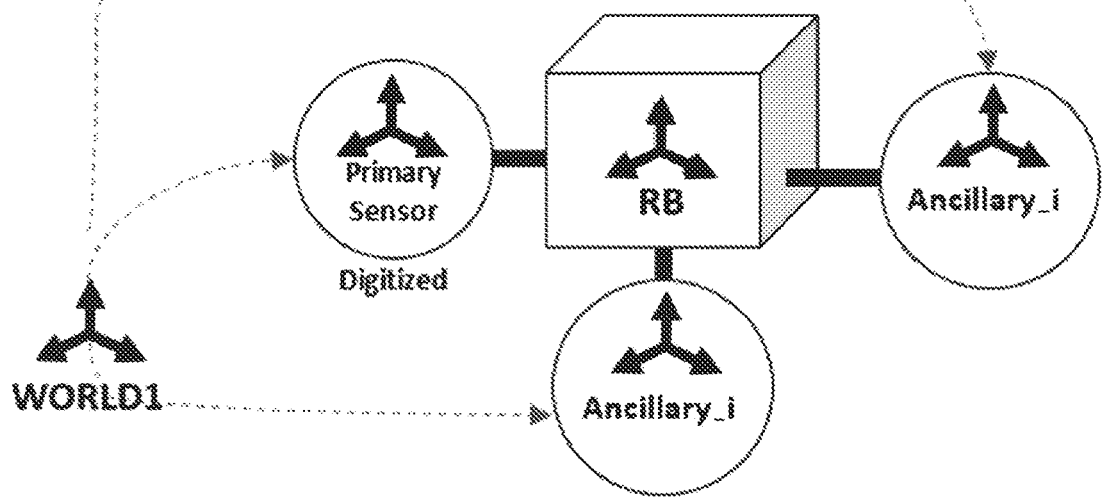
FIGS. 7 and 8 are diagrams showing the kinematic relationships of parts of the system of FIG. 4 during operation of the system.
Figure 7:
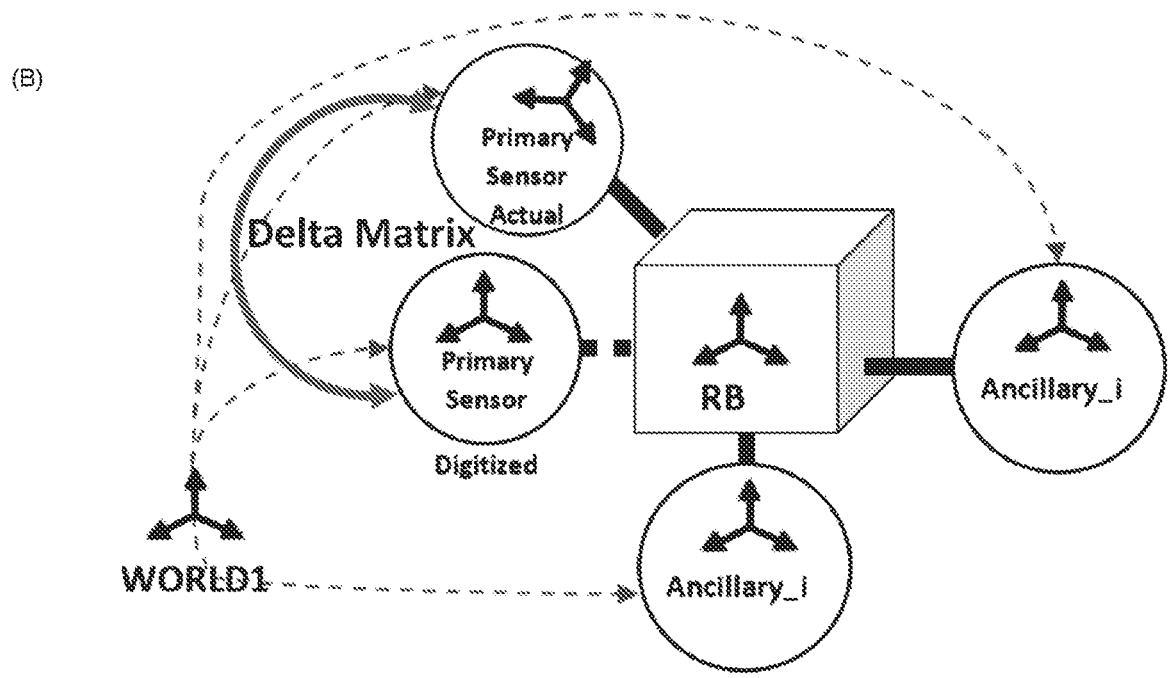

The placements and/or weights of the at least one ancillary sensor 106, and the primary sensor 104, on the object 92 and/or on the robotic system 94 and the equations used within the controller 96 can also depend, in part, on whether an object 92 is a single object or two objects (joined together). FIG. 7 displays a graphical representation of the compliance calculation of an aspect of system 90 when the object 92 is a single a rigid body (e.g., with respect to a stationary reference point (world1). Element (a), on the left, shows the initial configuration of the system at before any movement has occurred (e.g., upon digitization). Element (b), on the right, shows the system with compliance. The actual position of the primary sensor has compliance due to a change in actual position of the primary sensor in world 1 ($T_{w1\_P4ct}$). The rigid body position also has compliance due to both the actual position of the primary sensor in world 1 ($T_{w1\_P4ct}$) and the dynamic relationship between the actual position of the primary sensor and the rigid body ($T_{P4ct\_RB}$) having compliance. The delta value accounts for the compliance.

The initial positions and/or orientations of the primary sensor 104 and the at least one ancillary sensor 106 are assumed to be correct before the object 92 moves (e.g., at digitization). This allows the system to determine where the rigid body (e.g., object 92) is in space ($T_{w1\_RB}$). The position and/or orientation of the primary sensor 104 is reported by itself ($T_{w1\_P}$). Given that, we have a simple kinematic chain that can tell us the relationship of the primary sensor 104 to the rigid body after digitization.

$$T_{P\_RB}=T_{w1\_P}^{-1}T_{w1\_RB}$$

Without visual servoing, this relationship is assumed to be static. To know where a rigid body is in real time the following simple equation is used. However, this equation does not account for compliance.

$$T_{w1_{RB}}=T_{w1p}T_{P\_RB}$$

Where $T_{P\_RB}$ is obtained from digitization in a previous equation. $T_{w1\_P}$ is the primary sensor's real time output. However, in a compliant system $T_{P\_RB}$ is often not static, and the primary sensor 104 can then move with respect to the object 92. Further, $T_{w1\_P}$ can have error baked into it due to compliance coloring the primary sensor's 104 data. Dynamic pose correction assumes the at least one ancillary sensor 106 has less compliance in its reported position than the primary sensor 104, and thus is more accurate.

In the case of a robotic system 94 with a tool mounted to a robot, the robot could be the primary sensor 104 and the tool could be the object 92. The robot itself can have compliance and report incorrect positions ($T_{w1\_p}$). Further, the tool can flex relative to the robot meaning that $T_{P\_RB}$ is dynamic. In such a scenario putting ancillary sensors on the tool will allow for correction of the errors due to compliance in both $T_{w1\_P}$ and $T_{P\_RB}$. This is done via a "delta" or correction value being added to the previous equation to get:

$$T_{w1\_RB} = T_{w1\_PAct} \overline{T_{PAct\_PDig}} T_{PDig\_RB}$$

Where:

$T_{PDig\_RB}$: Static relationship between the rigid body and Primary sensor when they were first digitized.

$\overline{T_{PAct\_PDig}}$: Delta value. It is the dynamic relationship between where the ancillary sensors calculate the primary sensor to be (PAct) and where the Primary sensor was when first digitized (PDig). This is also called the Delta value. If there are multiple ancillary sensors, then the delta matrix is the average (as denoted by the accent) of where the ancillary sensors calculate the primary sensor to be.

$T_{Pw1\_PAct}$: Dynamic relationship of where the primary sensor is with respect to world 1.

Where: The delta value can be thought of as correcting errors in both $T_{w1\_PAct}$ and $T_{PDig\_RB}$. The delta value can be calculated with a single ancillary sensor using the following equation. The delta value can be calculated with more than one ancillary sensor by applying interpolation and/or weighted averaging to the product of this equation:

$$T_{PAct\_PDig} = T_{w1\_PAct}^{-1} T_{w1\_Ai} T_{Ai\_PDig}$$

Where:

$T_{w1\_Ai}$: Position of ancillary sensor i relative to world 1.
$T_{Ai\_PDig}$: Initial relationship of the ancillary sensor i to the primary sensor. Making the key assumption that this matrix is accurate during digitization.

Figure 8:
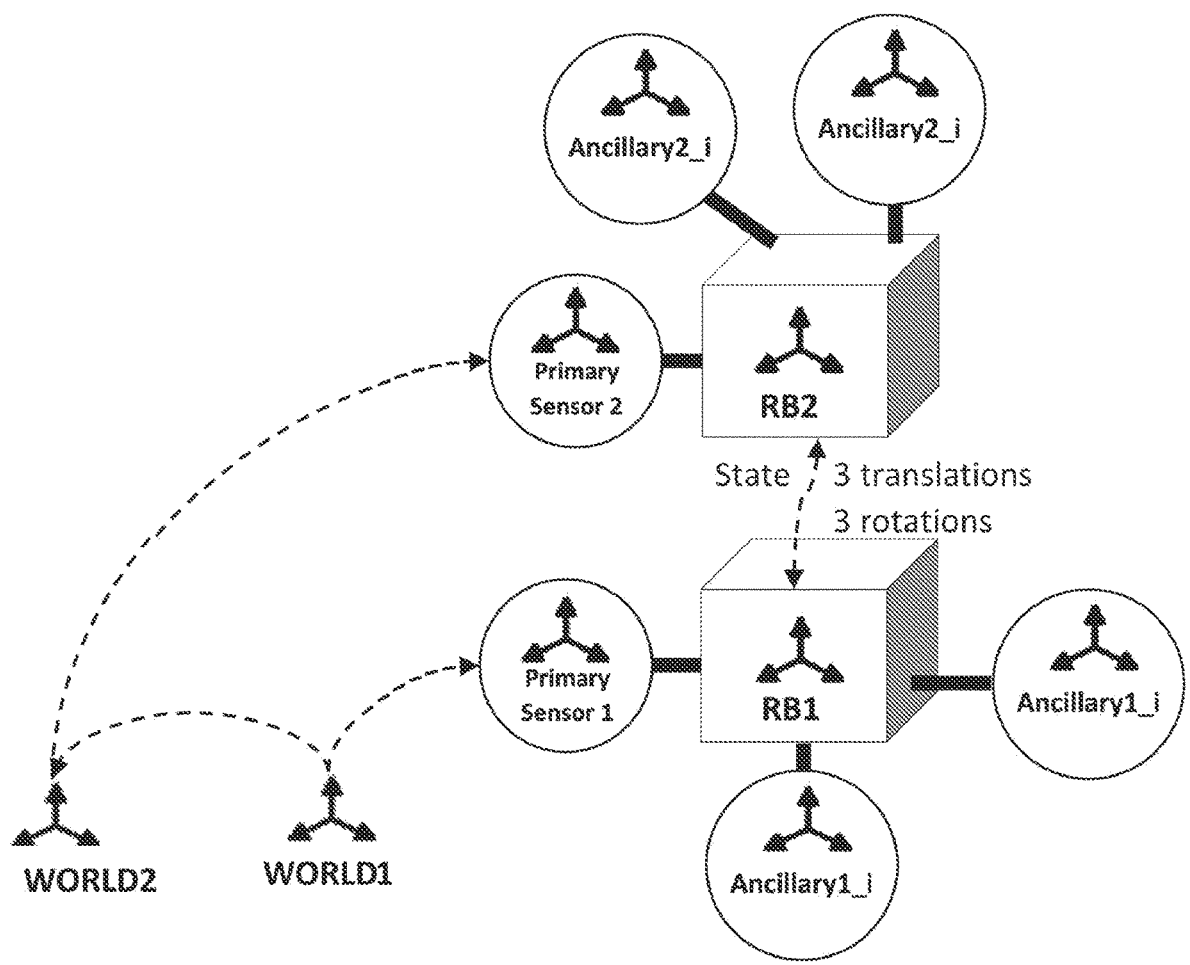

FIG. 8 represents a compliance calculation when the object 92 includes two separate rigid bodies. The compliance calculation can be:

$$T_{RB1\_RB2} = T_{RB1\_P1Dig}$$
$$\overline{T_{P1Dig\_P1Act}} T_{P1Act\_w1} T_{w1\_w2} T_{w2\_P2Act}$$
$$\overline{T_{P2Act\_P2Dig}} T_{P2Dig\_RB2}$$

Where:

$T_{RB1\_P1Dig}$: Static relationship between rigid body 1 and where Primary sensor 1 was when first digitized.
$\overline{T_{P1Dig\_P1Act}}$: Dynamic relationship between where the ancillary sensors calculate the primary sensor to be (P1Act) and where the Primary sensor 1 was when first digitized (P1Dig). This is also called the Delta 1 Matrix. If there are multiple ancillary sensors, then it is the average (as denoted by the accent) of where they calculate the primary sensor to be.
$T_{P1Act\_w1}$: Dynamic relationship of where world 1 is relative to primary sensor 1 over time.
$T_{w1\_w2}$: Static relationship between world 1 and world 2. This is only necessary when primary sensor 2 doesn't give its position in world 1 already. For example, if the primary sensor is a robot.
$T_{w2\_P2Act}$: Dynamic relationship of where primary sensor 2 is to world 2. For example, robot position.
$\overline{T_{P2Act\_P2Dig}}$: Dynamic relationship between where the ancillary sensors calculate the primary sensor to be (P2Act) and where the Primary sensor 2 was when first digitized (P2Dig). This is also called the Delta 2 Matrix. If there are multiple ancillary sensors, then it is the average (as denoted by the accent) of where they calculate the primary sensor to be.
$T_{P2Dig\_RB2}$: Static relationship between rigid body 2 and where Primary sensor 2 was when first digitized.

The delta calculations below are for each rigid body:

$$T_{P1Act\_P1Dig} = T_{w1\_P1Act}^{-1} T_{w1\_A1i} T_{A1i\_P1Dig}$$

$$T_{P2Act\_P2Dig} = (T_{w1\_w2} T_{w2\_P2Act})^{-1} T_{w1\_A2i} T_{A2i\_P2Dig}$$

Where:

$T_{w1\_P1Act}$: Primary sensor relative to world 1.
$T_{w1\_A1i}$: Position of ancillary sensor attached to rigid body1 relative to world 1. The i designation means it is the $i^{th}$ ancillary sensor attached to rigid body1.
$T_{A1i\_PDig}$: Initial relationship of the $i^{th}$ ancillary sensor attached to rigid body1 to primary sensor 1. We make the key assumption that this matrix is accurate during digitization.
$T_{w1\_w2} T_{w2\_P2Act}$: Getting primary sensor 2 position also in the world 1 reference frame.
$T_{w1\_A2i}$: Position of ancillary sensor attached to rigid body 2 relative to world 1. The i designation means it is the $i^{th}$ ancillary sensor attached to rigid body 2.
$T_{A2i\_PDig}$: This is the initial relationship of the $i^{th}$ ancillary sensor attached to Rigid body 2 to primary sensor 2. The key assumption that this matrix is accurate during digitization is made.

The kinematic chain shown in FIG. 8 can therefore be thought of as:

$$T_{R1\_RB2} = T_{RB1\_P1} T_{P1\_w1} T_{w1\_w2} T_{w2\_P2} T_{P2\_RB2}$$

When the object 92 is two objects system 90 can further include the second object that can be moved by the robotic system 94 where a point on the second object is at a known initial position and orientation. Note that the object 92 can include any number of objects with similar mathematical treatment. The system 90 also further includes a second primary sensor positioned at a first location on the second object and at least one second ancillary sensor, each positioned at unique locations on the second object. The second primary sensor and the at least one second ancillary sensor can record position and orientation data. The controller 96 can include further instructions regarding the sensors, the robotic system 94, and/or the objects. Before the object 92 and the second object move the controller 96 can receive initial position and orientation data of the second primary sensor in the coordinate system from the second primary sensor and the initial position and orientation data of the at least one second ancillary sensor form the at least one second ancillary sensor. The controller 96 can determine a static relationship between the second primary sensor and the second object based on the initial position and orientation data of the second primary sensor and the known initial position and orientation of the point on the second object. The controller 96 can also determine a static relationship between the at least one second ancillary sensor and the second object based on the initial position and orientation data of the at least one second ancillary sensor and the known initial position and orientation of the point on the second object. And based on the static relationship between the at least one second ancillary sensor and the second object and the static relationship between the second primary sensor and the second object determine a static relationship between the at least one second ancillary sensor and the second primary sensor.

While at least one of the object 92 and the second object is moving the controller 96 can generate a trajectory of the second object. The trajectory of the second object can be a path between one location in space to another location in space, these may be the same or different from the first and second locations of the trajectory of object 92. The controller 96 can sample the second primary sensor to receive position and orientation data of the second primary sensor at the time and sample the at least one second ancillary sensor to receive position and orientation data of the at least one second ancillary sensor at the time. The time being the same time the at sensors 104 and 106 on object 92 are being sampled. Then the controller 96 can determine another delta value representing another amount of deviation between the initial static position and orientation of the second primary sensor and an estimated position and orientation of the second primary sensor at the time, wherein the other amount of deviation is based on based the position and orientation data of the second primary sensor at the time, the position and orientation data of the at least one second ancillary sensor at the time, and the static relationship between the second primary sensor and the at least one second ancillary sensor. The controller 96 can then modify the trajectory of the second object based on the other delta value, the position and orientation data of the second primary sensor at the time, and the static relationship between the initial static position and orientation of the second primary sensor and the initial static position and orientation of the point on the second object.

When the second object has a second coordinate system the transformation between the coordinate system and the second coordinate system can be known so sensor data can be transformed into the coordinate system for calculation purposes. The controller 96 can thereby sample the second primary sensor and/or the at least one second ancillary sensor to receive position and orientation data in the second coordinate system. The position and orientation data of the second primary sensor and/or the at least one second ancillary sensor can then be transformed from the second coordinate system into the coordinate system by the controller 96. The previously described controller 96 calculations can then continue without the addition of further transformations. Additionally, every functionality of the robotic system described above with respect to a single object in the system can also apply to two objects in the system.

Figure 9:
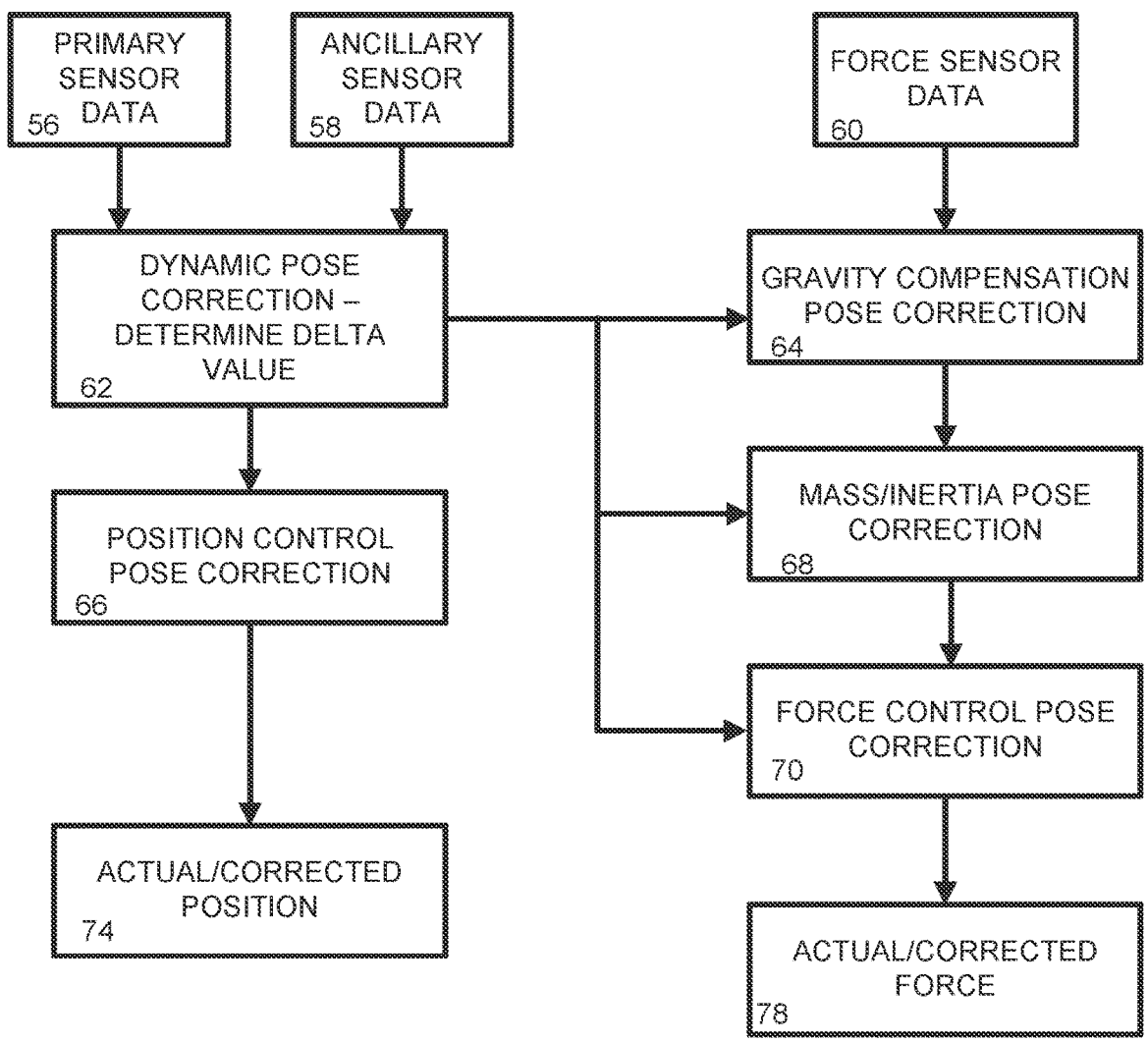
FIG. 9 is a diagram showing the system of FIG. 4 implementing dynamic pose correction.

Therefore, the robotic control system 90 can implement the overall acts 140 shown in FIG. 9 to modify the trajectory, and movement, of an object 92 to take into account compliance in the robotic system 94 and/or the object 92. The controller 96 receives primary sensor data 56 and ancillary sensor data 58 and completes dynamic pose correction calculations to determine a delta value 62 that accounts for compliance in the system. The delta value accounts for compliance in the system by factoring in the small movements between parts of and/or connections between the object 92 and/or the robotic system 94 that are traditionally ignored as negligible. The small movements are determined based on changes in the relationships between the sensors 104 and 106, the object 92, and the robotic system 94 before, during, and after motion. The delta value can be applied to correct the position control pose 66 (which can be used to create corrected position data 72) and, if force sensor data is also received, to the gravity compensation pose 64, the mass/inertia pose 68, and the force control pose 70 (which can be used to create corrected force data 74). The corrected position data 72 and the corrected pose data 74 can be used to modify the pose of the object.

The system 90, as described with regard to FIGS. 4-9, can be used to perform methods 200 and 300 (FIGS. 10 and 11) for configuring a robotic control system. The methods are illustrated as process flow diagrams with flowchart illustrations. For purposes of simplicity, the methods are shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the methods. It should be noted all aspects of the system 90 described with regard to FIGS. 4-9 may not be required to implement the methods 200 and 300.

FIG. 10 illustrates a method for controlling movement of an object (e.g., object 92 of system 90). At 202, a controller comprising a processor (e.g., controller 96 of system 90) can retrieve a profile, which can include a trajectory and/or components of the trajectory. The trajectory can be a path between a first location in space to a second location in space. The object can be moved by a robotic system controlled by the processor. The object can be a tool or a base within the robotic system or a secondary object acted on by a part of the robotic system. The object can be a rigid body or a deformable body, as described above. At 204, the controller can sample a primary sensor to receive position and orientation data of the primary sensor in a coordinate system at a time. The primary sensor can be positioned at a first location on the object and can record position and orientation data. The time can be based on a sampling frequency or manual sampling based on a user input. At 206, the controller can sample at least one ancillary sensor to receive position and orientation data of the at least one ancillary sensor in the coordinate system at the time. The at least one ancillary sensor can be positioned at a unique location on the object to record position and orientation data.

At 208, the controller can determine a delta value representing an amount of deviation between an initial static position and orientation of the primary sensor and an estimated position and orientation of the primary sensor at the time. The delta value can be based on the position orientation data of the primary sensor at the time, the position and orientation data of the at least one ancillary sensor at the time, and a static relationship between the primary sensor and the at least one ancillary sensor. The delta value can correct for compliance in the object and/or the robotic system. At 210, the controller can modify the trajectory of the object based on the delta value, the position and orientation data of the primary sensor at the time, and a static relationship between the initial static position of the primary sensor and an initial static position and orientation of a point on the object. Modifying the trajectory can be modifying the trajectory in from 1 to 6 degrees of freedom. Modifying the trajectory can correct for compliance in the object and/or the robotic system by correcting one of a plurality of poses. The plurality of poses can include a position control pose, a gravity compensation pose, a force control pose and/or an inertia/mass pose. The position control pose can be corrected based on data from the primary sensor and the at least one ancillary sensor. The gravity compensation pose, the force control pose, and the inertia/mass can be corrected based on data from the primary sensor, data from the at least one ancillary sensor, and data from at least one force sensor. The data from the at least one force sensor can include forces and/or torques. The method can also include moving the object with the robotic system controlled by the controller in at least one of a rotation and a translation based on the modified trajectory.

Before method 200 for controlling movement of an object occurs, method 300 can be completed before the object moves. At 302 the controller can establish the coordinate system. Within the coordinate system an initial position and orientation of a point on the object is known. At 304, the controller can receive initial position and orientation data of the primary sensor. At 306, the controller can determine the static relationship between the primary sensor and the object based on the initial position and orientation data of the primary sensor and the known initial position and orientation of the point on the object.

At 308, the controller can receive the initial position and orientation data of the at least one ancillary sensor in the coordinate system from the at least one ancillary sensor. At 310, the controller can determine a static relationship between the at least one ancillary sensor and the object based on the initial position and orientation data of the at least one ancillary sensor and the known initial position and orientation of the point on the object. At 312, the static relationship between the at least on ancillary sensor and the primary sensor can be determined by the controller based on the static relationship between the at least one ancillary sensor and the object and the static relationship between the primary sensor and the object.

Before modifying the trajectory, the method can include: the controller low pass filtering the delta value and weighting the delta value based on at least one of an accuracy, a proximity, a reliability, and a precision of the at least one ancillary sensor. When the at least one ancillary sensor is two or more ancillary sensors determining the delta value can include the following steps. Determining, by the controller, separate delta values for each of the two or more ancillary sensors and low pass filtering, by the controller, the separate delta values. The controller can then weight each of the two or more ancillary sensors based on the accuracy of each of the two or more ancillary sensors. The weight can also be based on the reliability, proximity, and precision of each of the sensors. The controller can then interpolate the separate delta values to determine the delta value used to modify the trajectory of the object. The interpolating can be done by quaternion weighted averaging.

Additionally, when the system 90 includes a second object in addition to object 92 the method can include more steps, not illustrated, to be completed by the controller. Before the object or the second object move, the controller can retrieve a known initial position and orientation of a point on the second object and receive initial position and orientation data from a second primary sensor positioned at a first location on the second object. The second primary sensor can record position and orientation data. The controller can then determine a static relationship between the second primary sensor and the second object based on the initial position and orientation data from the second primary sensor and the known initial position and orientation of the point on the second object. The controller can receive initial position and orientation data in the second coordinate system from at least one second ancillary sensor. Each of the at least one second ancillary sensors can be positioned at a unique location on the second object and can record position and orientation data. The controller can then determine a static relationship between the at least one second ancillary sensor and the second object based on the initial position and orientation data of the at least one second ancillary sensor and the known initial position and orientation of the point on the second object. Finally, the controller can determine a static relationship between the at least one second ancillary sensor and the second primary sensor based on the static relationship between the at least one second ancillary sensor and the second object and the static relationship between the second primary sensor and the second object.

While at least one of the object and the second object is moved by the robotic system 94 the method can also include the following steps. The controller 96 can generate a trajectory of the second object. The trajectory of the second object can be a path between one location in space to another location in space. The controller 96 can then sample the second primary sensor to receive position and orientation data of the second primary sensor at the time and sample the at least one second ancillary sensor to receive position and orientation data of the at least one second ancillary sensor at the time. The time can be based on the sample frequency or a manually entered user input time. The controller can then determine another delta value representing another amount of deviation between the initial static position and orientation of the second primary sensor and an estimated position and orientation of the second primary sensor at the time. The other amount of deviation can be based on the position and orientation data of the second primary sensor at the time, the position and orientation data of the at least one second ancillary sensor at the time, and the static relationship between the second primary sensor and the at least one second ancillary sensor. The controller can modify the trajectory of the second object based on the other delta value, the position and orientation data of the second primary sensor at the time, and the static relationship between the initial static position and orientation of the second primary sensor and the initial static position and orientation of the point on the second object.

When the second object has a second coordinate system that is different from the first coordinate system and the transformation between the coordinate system and the second coordinate system is known the method can include the following additional steps. The controller can sample the second primary sensor and/or the at least one second ancillary sensor to receive position and orientation data in the second coordinate system. And the controller can transform the position and orientation data of the second primary sensor and/or the at least one second ancillary sensor from the second coordinate system into the coordinate system.

VI. Hybrid Force and/or Position Control

Figure 12:
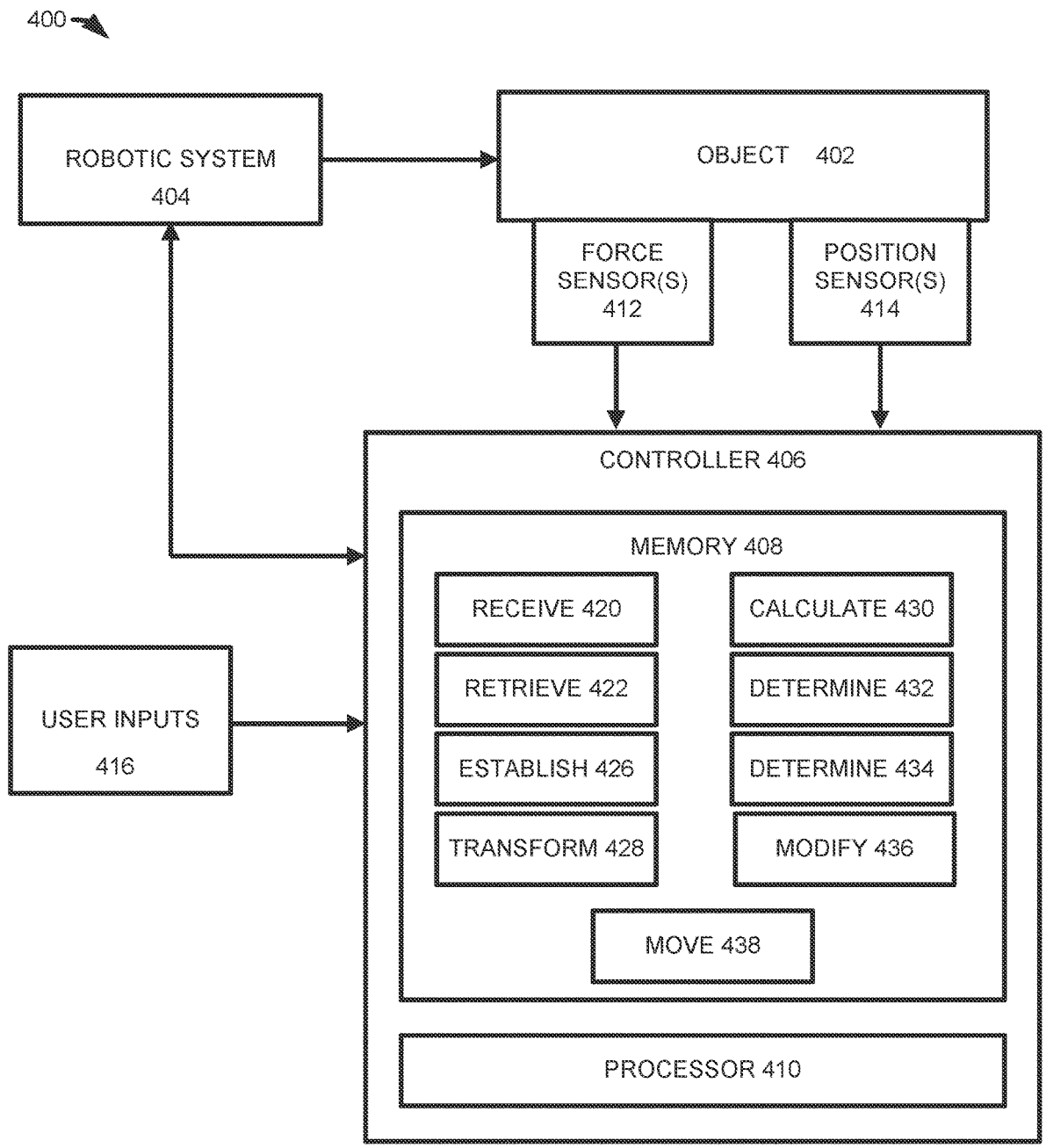
FIG. 12 is a diagram illustrating a system that controls a robotic system by implementing hybrid control.

Hybrid force and/or position control is another example of a control algorithm (CA1 17_1-CAN 17_N). A system 400 that causes a robotic system 404 to move and/or act on at least one object 402 based on hybrid force and/or position control is shown in FIG. 12. The robotic system 404 can be controlled by controller 406, which includes non-transitory memory 408 and processor 410, in response to data input from at least one force sensor 412 (e.g., a pneumatic load cell, a force transducer, an inductive load cell, a strain gauge load cell, etc.), at least one position sensor 414 (e.g., an optical sensor, a linear variable differential transformer (LVDT), a hall effect sensor, a capacitive displacement sensor, etc.), and user inputs 416. The at least one object 402 may be a single object or multiple objects. The at least one force sensor 412 can be positioned on the at least one object 402 to measure actual forces associated with the at least one object 402. The actual forces can be applied by, to, from, or with the at least one object 402 depending on the task assigned to the robotic system 404 and the identity of the at least one object. The at least one position sensor 414 can be positioned on the at least one object 402 to measure actual positions associated with the at least one object 402. The at least one position sensor 414 and/or the at least one force sensor 412 may include the primary sensor 104 and the at least one ancillary sensor 106 discussed above with respect to the dynamic pose correction control system 90.

The robotic system 404 can include at least a robot, a tool, a base, and a load cell. The at least one object 402 can be a tool within the robotic system, a base within the robotic system, and/or a secondary object acted upon by a portion of the robotic system 404. The at least one object 402 can be a rigid body or a deformable body. A rigid body is a solid body in which deformation is zero or so small it is traditionally neglected (e.g., the distance between any two given points on a rigid body remains constant regardless of external forces or moments exerted on the rigid body). When rigid bodies are combined the small amounts of deformation can compound to become problematic to successful robotic control. A deformable body is a body that changes its shape and/or volume while being acted upon by any kind of external force. For example, a system of rigid bodies with non-rigid connections is an example of a deformable body.

The controller 406 can be coupled to the robotic system 404 and/or the at least one force sensor 412 and the at least one position sensor 414. In some instances, the coupling between the controller 406 and the robotic system 404 and/or the coupling between the controller 406 and the at least one force sensor 412 and/or the at least one position sensor 414 can be via a wired connection. In other instances, the coupling between controller 406 and the robotic system 404 and/or the coupling between the controller 406 and the at least one force sensor 412 and/or the at least one position sensor 414 can be via a wireless connection. In still other instances, the coupling between the controller 406 and the robotic system 404 and/or the coupling between the controller 406 and the at least one force sensor 412 and/or the at least one position sensor 414 can be via a connection that is both wired and wireless. Similarly, in some instances, the at least one force sensor 412 and the at least one position sensor 414 can be coupled to the robotic system 404 according to a wireless connection and/or a wired connection. Additionally, each element of the system 400 may have additional components to aid in the coupling that are not illustrated.

The controller 406 can include at least the non-transitory memory 408 and the processor 410. The non-transitory memory 408 can store machine executable instructions, which are executable by the processor 410. The instructions can be a control algorithm with components for receiving 420, retrieving 422, establishing 426, transforming 428, calculating 430, determining 432 and 434, modifying 436, and moving 438. In some instances, the non-transitory memory 408 and the processor 410 can be combined in a single hardware element (e.g., a microprocessor), but in other instances, the non-transitory memory 408 and the processor 410 can include at least partially distinct hardware elements.

Figure 13:
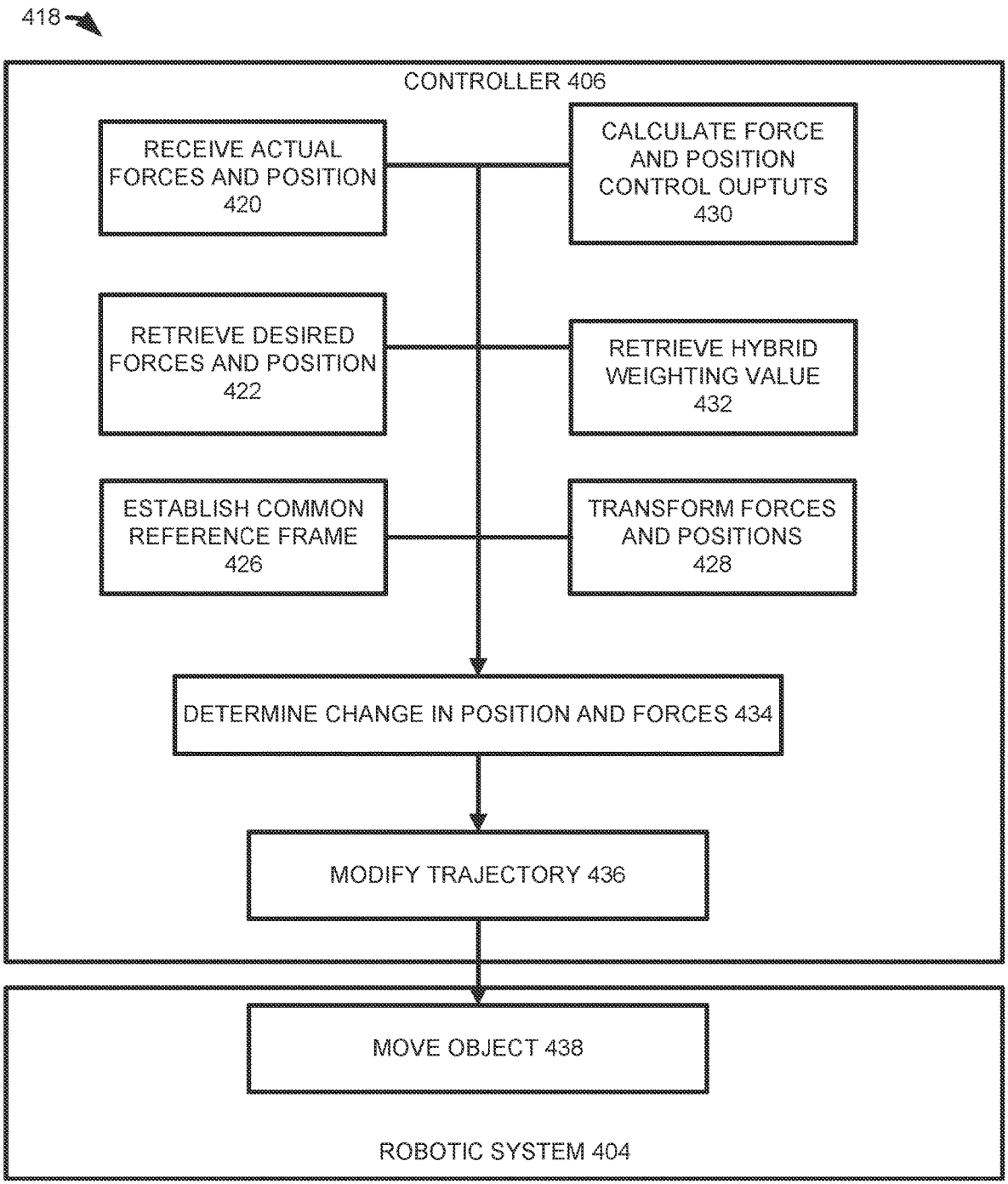
FIG. 13 is a diagram illustrating the control logic of hybrid control that can be used by the system of FIG. 12.
Figure 14:
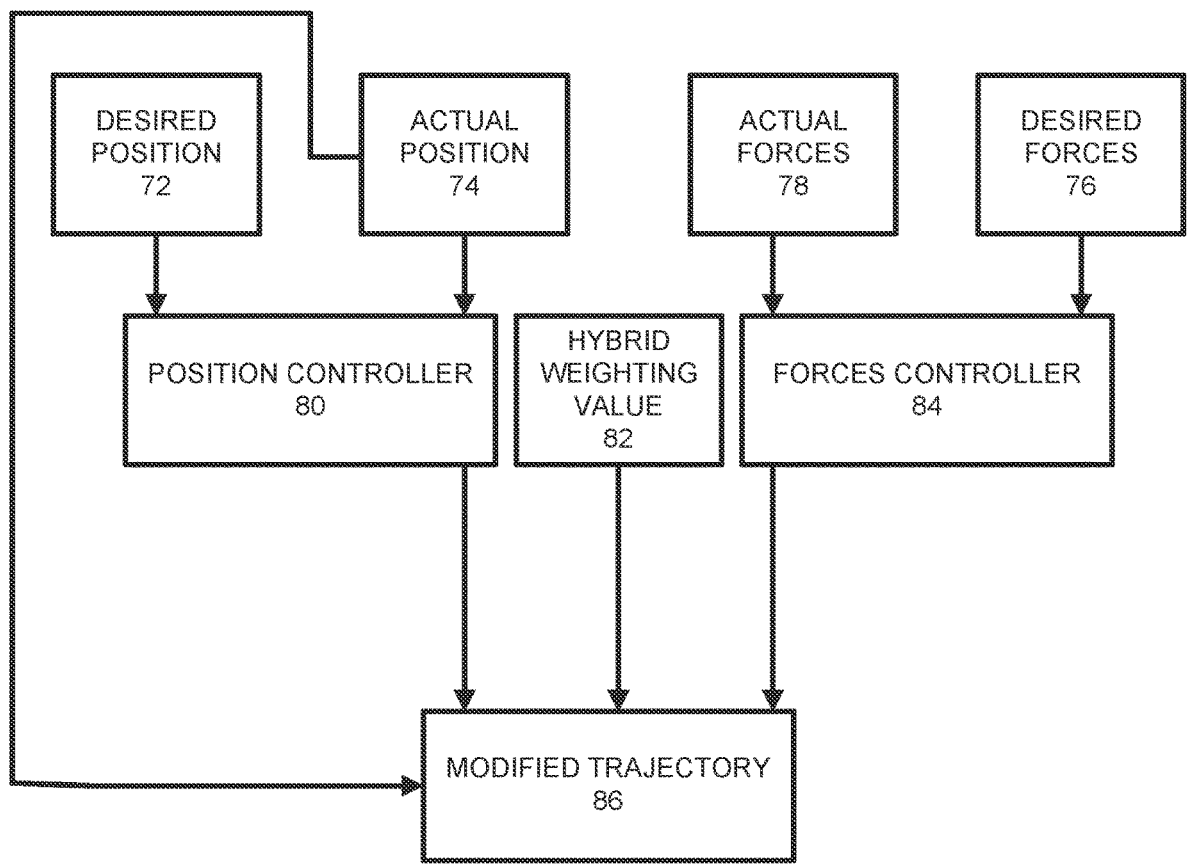
FIG. 14 is a diagram showing the system of FIG. 12 implementing hybrid control.

As shown in diagram 418 of FIG. 13 and diagram 440 of FIG. 14, hybrid force and/or position controller 52 can have the controller 406 perform a number of commands that can culminate in the at least one object 402 moving under hybrid force and/or position control. At 420, the controller 406 can receive the actual forces 78 associated with the at least one object 402 from the at least one force sensor 412 and receive the actual position 74 associated with the at least one object from the at least one position sensor 414. At 422, the controller 406 can retrieve the desired forces 76 to be associated with the at least one object 402 and the desired position 72 to be associated with the at least one object. The desired forces 76 and the desired position 72 can be input into the system 400 manually by a user and/or as part of a control loop (e.g., previously programmed and/or based on training). The desired forces 76 and the actual forces 78 can be measured in a first coordinate system and the desired position 72 and the actual position 74 can be measured in a second coordinate system. A trajectory of an object 402 can be iterative, such that the object 402 is continuously moving to a new desired position at desired forces (e.g., the writing on a chalkboard example—a trajectory is determined for each point and modified for each new desired force and position to write a word on the chalkboard).

At 426 the controller 406 can establish a common reference frame for the actual forces 78, the actual position 74, the desired forces 76, and the desired position 72. At 428 the controller 406 can transform the actual forces 78, the actual position 74, the desired forces 76, and the desired position 72 from the respective first and second coordinate systems to the common reference frame. In some instances, only the actual forces 78 and desired forces 76 or the actual position 74 and desired position 72 may need to be transformed (e.g., the common reference frame aligns with either the first or second coordinate system). Once the actual and desired forces 76 and 78 and positions 72 and 74 are in the same reference frame the controller 406 can calculate force and position control outputs at 430. The force control output can be determined based on the difference between the actual forces 78 and the desired forces 76 and the position control output can be determined based on the difference between the actual position 74 and the desired position 72.

The position controller 80 and the forces controller 84 can include a combination of control laws the outputs of which can be used to determine the force control output and the position control output. The combination of control laws can comprise a partially non-linear proportional-integral-derivative controller, a feedforward controller, and/or a deadband controller. The proportional-integral-derivative controller can be broken into three constituent parts. Proportional control looks at the difference between a desired value and the actual value (e.g., the input error) and causes the controller output to increase proportional to the amount of error (e.g., controller output=proportional gain*(desired value−actual value). Integral Control seeks to change the output of the controller in response to steady state errors by changing the controller output based on errors accumulated (e.g., mathematically integrated) over time. Some limitations of common integral control approaches are that they can have integral wind-up and inertial overshoot. The approach utilized in the position controller 80 and the forces controller 84 solves both of these problems by preventing accumulation of errors during saturation (removing wind-up) and dumping the accumulated errors when the sign of the error changes (removing inertial overshoot). Derivative control seeks to prevent the system from responding to quickly by reducing controller output by computing the rate of the change of the system (e.g., actual value at the last time step−actual value at the current time step), multiplying by the derivative gain, and then subtracting that from the controller output. One major limitation of common derivative control approaches is that the rate of change calculation can be noisy because it is a numerical derivation. In this situation it can become difficult to get the derivative gain high enough to be effective without causing instability. The approach used in position controller 80 and forces controller 84 improves that by adding a user modifiable exponential filter. This acts as a very computationally efficient low pass filter that can be capable of greatly reducing the noise and thus allowing the derivative controller to be used more effectively.

Proportional-integral-derivative control is a very powerful algorithm but has limitations. One of those limitations is that it will lag behind the desired value because it only makes changes to the controller output when there is a difference between the desired and actual value. Another limitation is that instability can result from selecting a proportional gain or a derivative gain that is too high. Feedforward control is a control technique used to overcome some of these challenges by only changing the controller output when the desired value is changing. Instability and lagging, inherent to proportional-integral-derivative controllers, are not present with feedforward controllers, though feedforward controllers also have limitations when used alone. When used in combination, a PID-FF controller can get the best of both approaches when using properly set parameters. The parameters of the position controller 80 and the forces controller 84 can be set by a user and/or by a control loop. A deadband controller can also be added to the PID-FF controller in the position controller 80 and the forces controller 84. The deadband controller acts as a 'close enough' term and prevents the controller output from making any changes when the error between the desired and actual values is sufficiently small. This type of controller is helpful in mechatronic applications where static friction is present and the system is in force control. The immediate switch in friction force direction that is caused by a sign change in the velocity of the system can cause limit cycling type instability. By adding deadband to the position controller 80 and the force controller 84 the limit cycling can be eliminated.

The position controller 80 and the force controller 84 can utilize a non-linear PID controller designed to reduce overshoot and oscillation around any point in the stiffness spectrum by effectively reducing the controller output in a non-linear way as the desired position 72 and/or desired forces 76 are getting closer to the actual position 74 and/or the actual forces 78. A proportional controller (P in the PID) is traditionally linear in the relationship between controller output (e.g., robotic system 404 movement speed) and error between the desired and actual value being controlled. The greater the error, the faster the robotic system 404 moves to reduce the error. If the stiffness of the at least one object 402 being controlled was linear a single Proportional Gain parameter could be chosen that works for all situations. However, when the stiffness is non-linear the gain parameter that works well for the high stiffness regions may not be responsive enough for the lower stiffness regions. Likewise, a gain that works well for the low stiffness regions may create system instability when the at least one object 402 is loaded to the point it is in the high stiffness region. The hybrid force and/or position controller 52, and the adaptive compensation framework (discussed below), allows Proportional Gain, as well as a number of other parameters, to be modified throughout the trajectory execution so that appropriate gain values can be used depending on what stiffness region the at least one object 402 is in. This real-time modification of the parameters can be one approach to accommodating system non-linearity. Another benefit that is provided by the hybrid force and/or position controller 52 is the ability to use non-linear forms of the proportional control error calculation if a person of ordinary skill in the art so desires.

As discussed above the combination of control laws (e.g., PID-FF-DB) has a number of parameters and each of the number of parameters can be varied in real time as the at least one object 402 moves for the most effective control. As the at least one object is moved along the trajectory, the number of parameters can be varied by interpolating between way points defined in the trajectory and by adaptively compensating with inputs from at least one other source. Interpolation can reduce the number of parameters needing to be defined at any point in time by interpolating for each loop of the controller (e.g., each time the trajectory is modified). The adaptive compensation framework can take inputs from a wide variety of sources and can, at any instant in time, modify any of the parameters of the position controller 80 and/or the forces controller 84. Inputs to the system can include, but are not limited to sensors (e.g., force, pressure, position, vision, temperature, acceleration, velocity, stress, strain, and friction), human interaction with system (e.g., user interface input and physical interaction with robot), and process data (e.g., within the system and from other systems such as in an Internet of Things (IoT) manufacturing environment where upstream and downstream process data can provide meaningful input on how this system should operate). Adaptive compensation algorithms based on these inputs can modify parameters of the position controller 80 and/or the forces controller 84 in real time and the inputs can also be used in an iterative learning manner as part of a control loop in some instances. Adaptive compensation can include: adjusting/scaling controller parameters for current and future trajectory executions using human feedback of system non-linearity via a sensitivity slider; automatically increasing or decreasing system responsiveness in specific force ranges when hand guiding; detecting collisions and ensuring stability when robot touches the environment; improving load targeting by dynamically calculate environment stiffness in real-time and adjusting parameters; controlling robot motions and loads based on input from a pressure sensor (e.g. equalize pressure in region); detecting instability or other poor performance metrics, and then responding; using Artificial Intelligence to learn from sensors and process data in order to adapt parameters to improve performance; and combining physical testing with computational modeling so that virtual measurements can be made and controlled (e.g. control multi-axis strain state of tissue using real sensors as input to a targeted computational model of that tissue).

In some instances, the adaptive compensation framework can also do one or more of the following. Adjust parameters of position controller 80 and/or forces controller 84 for current and future trajectory executions using human feedback of system non-linearity via a sensitivity input. Automatically increase or decrease system responsiveness in specific force ranges when hand guiding the robotic system 404. Detect collisions and ensure stability when robotic system 404 touches the environment. Improve load targeting (e.g., how to go between actual forces 78 and desired forces 76) by dynamically calculating environment stiffness in real-time and adjusting parameters. Robotic system 404 and/or object 402 motions and loads can be controlled based on input from a pressure sensor (e.g., equalize pressure in region). Detect instability or other poor performance metrics, and then respond by altering the parameters of position controller 80 and/or forces controller 84. Use artificial intelligence and deep learning to learn from sensor (e.g., force, position, velocity, pressure, etc.) and process data in order to adapt parameters of the position controller 80 and/or the forces controller 84 to improve performance. Multiple Input Multiple Output (MIMO) framework that allows mapping of any process data to any parameter of the position controller 80 and/or the forces controller 84 either in real-time or via iterative learning. Dynamically change control reference frame location and/or joint coordinate system definition.

Referring back to FIGS. 13 and 14, the controller 406 can retrieve a hybrid weighting value 82 from the non-transitory memory 408 at 432 based on an amount of position control required for the at least one object 402 to reach the desired position 72 at the desired forces 76 at a future time and an amount of force control required for the at least one object 402 to reach the desired position 72 at the desired forces 76 at the future time. The hybrid weighting value is variable in time based on at least one control variable. The at least one control variable can be based on at least one of a user input, data from at least one other sensor (e.g., other position sensor, other force sensor, friction, pressure, velocity, etc.), an adaptive compensation procedure (like the procedures described above with respect to the position controller 80 and the forces controller 84), and an iterative control loop (also described above).

At 434 the controller 406 can determine a change in position associated with the at least one object 402 and a change in forces associated with the at least one object based on the hybrid weighting value, the force control output, and the position control output. The change in position and the change in forces can vary as the hybrid weighting value varies in real time (as well as the force control output and the position control output) and acts as correction factor 88. The hybrid weighting value can be any value from 0 to 1, where 1 is all kinetic control and 0 is all kinematic control. To find the correction factor 88 the output of each of the control laws (e.g., PID-FF-DB) is treated as velocity and summed for each channel according the following relationship. Force control law outputs are multiplied by the hybrid weighting value and the position control law output is multiplied by (1-hybrid weighting value). In this way, a hybrid weighting value of 1 makes it all force control and a hybrid weighting value of 0 makes it all position control. Different hybrid weighting values can be applied to each degree of freedom the at least one object 402 is moving in at a time such that in one direction the controller 406 can be using only force control to move the at least one object, in a second direction the controller can be using only position control, and in a third direction the controller can be using a combination of position and force control to reach an ultimate goal.

At 436, the controller 406 can modify the trajectory of the at least one object 402 based on the change in position and the change in forces associated with the object. At 438 the controller 406 can instruct the robotic system 404 to move the at least one object 402 based on the modified trajectory, as it varies in real time. The trajectory can be modified each time the at least one force sensor 421 and the at least one position sensor 414 are sampled in addition to when they hybrid weighting value or a position and/or force control output varies based, for example, adaptive compensation or an iterative learning control loop. Based on the instructions, the robotic system 404 moves the at least one object 402.

Additionally, the robotic system 404 can also include at least one actuator to move a component associated with the at least one object 402 based on another hybrid weighting value, an actuator force control output, and an actuator position control output. Each determined in the same manner as described above. For example, exerting forces on multiple muscles and/or tendons in a foot or knee could require an actuator for each of the muscles and/or tendons to most accurately represent human movement. The addition of at least one actuator allows for extra levels of control of the robotic system 404 and/or the at least one object 402 within the control system 400.

The system 400 shown in FIG. 12 can be used to perform a method 500 (FIG. 15) for configuring a robotic control system. The methods are illustrated as process flow diagrams with flowchart illustrations. For purposes of simplicity, the methods are shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the methods. The method 500 can be implemented by some or all of the system 400 shown in FIG. 12.

Figure 15:
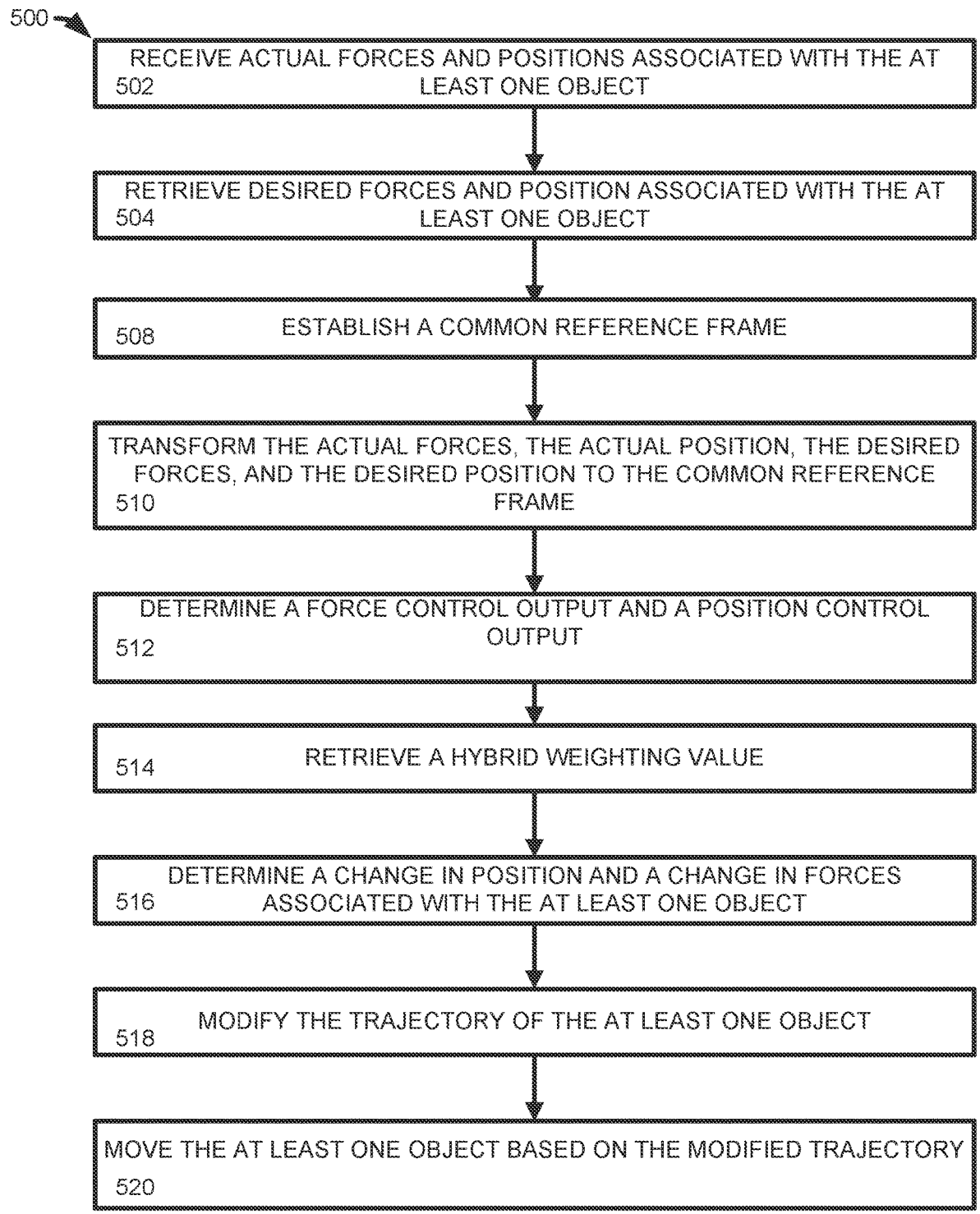
FIG. 15 is a process flow diagram illustrating a method for hybrid control.

FIG. 15 illustrates a method for controlling movement of at least one object (e.g., at least one object 402 of control system 400). The at least one object can be at least one of a tool within the robotic system (e.g., robotic system 404 of system 400), a base within the robotic system, or a secondary object acted upon by a part of the robotic system. The at least one object can be a rigid body or a deformable body. At 502, the controller, which can include a processor, can receive actual forces associated with the at least one object in a first coordinate system. The actual forces can be measured by at least one force sensor positioned on the at least one object. The actual forces can be forces applied by, to, from, or with the at least one object depending on the task assigned to the robotic control system. The controller can also receive an actual position associated with the at least one object in a second coordinate system. The actual position can be measured by at least one position sensor positioned on the at least one object. At 504, the controller can retrieve desired forces to be associated with the at least one object. The desired forces can be input into the system (e.g., system 400) in the first coordinate system. The controller can also retrieve a desired position to be associated with the at least one object. The desired position can be input into the system (e.g., system 400) in the second coordinate system.

The controller can establish a common reference frame for the actual forces, the actual position, the desired forces, and the desired position, at 508, and, at 510, the controller can transform the actual forces, the actual position, the desired forces, and the desired position from the respective first coordinate system and second coordinate system to the common reference frame. In some instances, only one of the forces or the positions may need to be transformed into the common reference frame (e.g., the common reference frame may align with one of the first or second coordinate systems).

At 512, the controller can determine a force control output based on the difference between the actual force and the desired force and determine a position control output based on the difference between the actual position and the desired position. Determining the force control output can also include comparing the actual forces and the desired forces using a combination of control laws, wherein the combination of control laws includes a partially non-linear proportional-integral-derivative controller, a feedforward controller, and a deadband controller. Determining the position control output can also include comparing the actual position and the desired position using a combination of control laws, wherein the combination of control laws includes a partially non-linear proportional-integral-derivative controller, a feedforward controller, and a deadband controller. The control law can have a number of parameters that are varied in time as the at least one object moves. And, as the object is moved the number of parameters can be varied in time by interpolating between way points defined in the trajectory and/or by adaptively compensating with inputs from at least one other source (as described above with respect to system 400).

At 514, the controller can retrieve a hybrid weighting value based on an amount of position control required for the at least one object 402 to reach the desired position at the desired forces at a future time and an amount of force control required for the at least one object to reach the desired position at the desired forces at the future time. The hybrid weighting value can be variable in time based on at least one control variable. The at least one control variable can be based on at least one of a user input, data from at least one other sensor, an adaptive compensation procedure, and an iterative control loop. Determining the hybrid weighting value can also include the user or the control loop inputting the amount of position control required for the at least one object to reach the desired position at the desired forces at a future time and the amount of force control required for the at least one object to reach the desired position at the desired forces at the future time into the controller 406.

At 516, the controller can determine a change in position and a change in forces associated with the at least one object based on the hybrid weighting value, the force control output, and the position control output. The change in position and change in forces can vary in real time as the hybrid weighting value, the force control output, and/or the position control output vary. At 518, the controller can modify the trajectory of the at least one object based on the change in position and the change in forces associated with the at least one object. Modifying the trajectory of the at least one object can also include querying the at least one force sensor and the at least one position sensor at a sampling frequency and modifying the trajectory at least at the sampling frequency. The trajectory can also be modified in real time based on the variability of the hybrid weighting value. At step 520, the robotic system associated with the controller can move the at least one object based on the modified trajectory. Additionally, when the robotic system includes at least one actuator, the at least one actuator can move a component associated with the at least one object based on another hybrid weighting value, an actuator force control output, and an actuator position control output (e.g., when the at least object must be moved in complex motions such as mimicking the forces on a foot or ankle during human movement).

VII. Example Case Studies

The following example case studies demonstrate uses of the systems and methods described above. The pose correction (force, gravity compensation, mass/inertia, and position) and hybrid force and/or position control can each be employed by a controller of a robot to improve performance of the robotic system. These example case studies show just three different uses of the systems and methods described here. It will be understood that countless other uses are possible.

Anterior Cervical Plating

Anterior cervical plating after decompression is a common procedure for the treatment of spinal pathologies including tumors, trauma, spondylosis, and infection. Use of the pose correction (force, gravity compensation, mass/inertia, and position) and the hybrid force and/or position control system improved anterior cervical plating. The pose correction ensured that measurements of motions and loads on the spine were more correct and reliable, while the hybrid force and/or position control system combined these more reliable and accurate measures with improved fidelity.

Methods

Experimental Methods: Six fresh, frozen cadaveric human spines from C2 to T1 were used in this study. The spine was mounted cranially to a 6 DOF robot (KUKA, KR16 GmbH) and caudally to a 6-axis load cell mounted on the base (GAMMA, ATI). Vertebral motion was captured using an optoelectronic camera system (Optotrak, Northern Digital, Inc.).

Surgical Methods: Three surgical conditions were tested: Intact spine, Anterior Cervical Plating Design A, and Anterior Cervical Plating Design B.

Testing methods: Flexibility tests were performed for each surgical condition. Flexibility tests applied a pure moment about one of the spine's primary axes (flexion/extension, left/right lateral bending, or left/right axial rotation) while all other off-axis loads were continuously minimized. The benefit of pure moment flexibility tests is that all levels were subjected to the same loads making for easy comparisons on range of motion (ROM) measurements across vertebral levels over various surgical conditions.

Problems Inherent to Traditional Flexibility Tests

To perform flexibility tests, a joint coordinate system (JCS) (joint center and joint axes) was defined at the center of the respective spinal region while at a neutral position (zero load state). Based on robot position measurements throughout joint motion, loads were applied to the recalculated position and orientation of the JCS. In most cadaveric joint studies, the joint consists of two bones only, which can be considered rigid bodies. In these cases, uncertainty in JCS measurements was due to insufficient stiffness in the robot, fixtures, and bones. In spine testing, typically, the spine can be modeled as two rigid bodies, although this is far from the case physically. While at neutral position, the physical and estimated spine JCS can be overlayed, but as the spine was moved, the deviation between the physical and estimated spine JCS increased. This means that loads applied to the estimated spine JCS were not being applied appropriately to the physicalspine JCS. This deviation between the physical and estimated JCS increased with increased motion and with added vertebrae.

When an incorrect JCS estimate was used in the control loop:
1. The applied JCS loads reported were not necessarily the actual loads applied to the spine.
   Any forces in the system can have incorrect moment arms for reporting torques.
   The reported pure moment loads can be not the actual applied moments when the bones reorient as they moved around during the testing.
   i. For example, if there was additional internal rotation in the center of the spine, a flexion moment as measured by the load cell would have an off axis torque in the center of the spine in the lateral bending direction, which would not be accounted for with an uncorrected pose based solely on robot data.
2. The actual applied loads can vary based on spine stiffness because orientations of the bones can be different with different stiffnesses of the spine.
   Various spines with different laxities can be subjected to different loads
   A single spine can be subjected to different loads under different surgical conditions
3. Labs that estimate motions differently can apply different loads.

Benefits Provided by Pose Correction

While loads were applied to an incorrect JCS calculated from robot position measurements, the resulting intervertebral joint kinematics were calculated from vertebral motion measured from optoelectronic motion capture sensors mounted to each vertebra. This was a far more accurate way to measure spine motion. The ability to utilize the spine kinematic measurements from motion capture into the feedback control of the robot (both kinematic and kinetic control) can allow for a more accurate application of spine loads. The main reason this is not typically done is because integrating motion capture into the feedback loop of robot control could be detrimental if sensor measurements are unreliable (which is often times the case). Missing or incorrect sensor data could cause dangerous movements if robot motion relies on their feedback alone. Integrating sensor fusion and pose correction, where reliable robot position measurements and accurate motion capture position measurements can be combined to obtain the most accurate joint position measurements without risking harmful robot motions, significantly improving reliability and reducing errors in spine testing force and motion data.

Benefits Provided by the Hybrid Force and/or Position Controller

These pose corrected measurements of the loads and motions of each segment of the spine were then be fed into the hybrid force and/or position controller that improve the ability of the robot to achieve the target loads quicker and more accurately. Recall, the hybrid force and/or position controller is made up of PID-FF-DB elements that have parameters that can be continuously modified throughout the trajectory execution. These parameter changes can be determined a priori or the adaptive compensation framework can be utilized to automatically determine them in real-time or through iterative learning. For example, the rotational stiffness of a spine generally has a non-linear relationship between torque and angle.

A proportional controller (P in the PID) is linear in the relationship between controller output (robot movement speed in our situation) and error between the desired and actual value being controlled. The greater the error, the faster the robot would move to reduce the error.

Robot Rotational Speed=Proportional Gain*(Desired Angle−Actual Angle)

If the spine stiffness was linear a single Proportional Gain parameter could have been chosen that works for all situations. However, when the stiffness is non-linear the gain parameter that worked well for the high stiffness regions may not be responsive enough for the lower stiffness regions. Likewise, a gain that worked well for the low stiffness regions may create system instability when the spine is loaded to the point it is in the high stiffness region. The hybrid force and/or position controller and adaptive compensation framework allowed Proportional Gain, as well as all the other parameters, to be modified throughout the trajectory execution so that appropriate gain values were used depending on what stiffness region the specimen was in.

Another benefit provided by the hybrid force and/or position controller, independent of the adaptive compensation framework, was the ability to use non-linear forms of the proportional control error calculation, when desired. This type of calculation is different than automatically changing the gain depending on the stiffness of the specimen. Instead, it was designed to reduce overshoot and oscillation around any point in the stiffness spectrum by effectively reducing the controller output in a non-linear way as the target load or position got closer to the actual.

The hybrid force and/or position controller was also beneficial in that it could be used to ensure the spine started in the right position before each test. Most spine testing is performed in force/torque control and this means that at the end of each loading profile the spine may not have returned to the neutral position because of the large lax region of the spine. In force control, when telling the robot to move the spine to 0 N, the robot can move the spine anywhere in the neutral (lax) region of the spine, and 0 N target can be satisfied. In other words, the spine may still be slumped forward at the end of the test, but should really be vertical to start the next text. To solve this, the hybrid force and/or position controller framework smoothly transitioned for 50% force and position control at the end of the test to keep the loads small, but also returned the rotation angles back to 0 (vertical spine=neutral position).

Orthopedic Implant

As the population of the US ages, orthopedic implants, such as knee implants, have become more common. Understanding in vivo motion of orthopedic implants is an important part of evaluating performance. The pose correction (force, gravity compensation, mass/inertia, and position) and the hybrid force and/or position control system improved the study of in vivo motion.

Simulation of these situations were often done via multi-axis mechanical simulators, with the goal being to apply full-body weight loading profiles at real-time speeds. There were two major challenges in performing tests of this sort:

Accurately measuring and applying desired kinetics/kinematics accounting for system compliance (i.e., robot, fixture and bone compliance), and Performing real-time force feedback control at real-time speeds corresponding to the activity of daily living (ADL) being tested.

Challenge 1

Joint motions could be calculated using robot position measurements or motion capture position measurements from sensors mounted on bones close to the joint surface. Using motion capture was a far more accurate way to measure joint positions as errors due to system compliance are reduced. However, measurements were less reliable as sensors could often be blocked or represented incorrectly. For this reason, joint positions calculated from reliable robot position measurements were typically used to control the robot.

A single knee implant was tested using a robotic musculoskeletal simulator that consisted of a pedestal base, ATI Omega 85 load cell, total knee replacement, and a Kuka KR300 robot. Active motion tracking sensors were mounted to the femur and tibia implants so as to be seen by the NDI Optotrak Certus stereoscopic motion tracking camera.

Various compression loads ranging from 900 to 2,200 N were applied to the joint and kinematic differences between joint positions calculated based on robot position, and motion tracking sensors were observed. Kinematic errors of over 2 mm in the superior direction were observed between the two measurement techniques at the maximum compression force and these errors could be attributed to system compliance. Furthermore, when tibia and femur kinematics reported based on robot position were fed into a computational model, the results showed a false ~3 mm penetration of the femur component into the tibia component.

While the robot kinematic data was considerably smoother and less noisy than the motion capture data, it was found to suffer from compliance induced accuracy problems. The linear relationship with force was likely due to machine and fixture compliance. When utilizing this data for kinematic control of biomechanical simulations, wear testing systems, or computational model validation, the machine compliance inaccuracies would degrade the kinematic integrity of the results. Wear testing, for example, can be performed by applying the same kinetic/kinematic profile to implants millions of times to characterize how the component changes. Kinematic controlled testing generally assumes the desired and actual kinematics match. If they don't, then the forces applied to the component would change, and introduce uncertainty in the results. However, motion tracking based kinematic measurement and control may not be a panacea and it can possess two major pitfalls to be aware of: visibility and noise.

Each rigid body motion tracking sensor was made up of 3 or more 3D markers which were combined together through a least-squares fit algorithm to determine the position and orientation of the rigid body. Occlusion of one or more markers so that less than 3 were visible resulted in no knowledge of rigid body location. In addition, occlusion of any one of the markers could affect the least squares fit result. Also, each of the markers had some stochastic noise associated with the measurement. This measurement (i.e., sensor location) was then transformed to the femur and tibia to calculate the JCS. Depending on the spatial relationship of the sensor and bone, this process could have amplified noise and visibility uncertainty in the resulting JCS kinematics. Lastly, kinematic control of a testing machine using an external measurement of position (e.g., motion capture) can be difficult due to these measurement uncertainties as well as other issues regarding control communication rates and robustness to noise and data dropouts.

Benefits Provided by Pose Correction for Challenge 1

Neither the robot nor motion capture based kinematics are ideal, but each have beneficial properties. Pose correction remedied the compliance shortcomings of robot kinematic data and lessened the pitfalls of the noise with the motion capture systems that combined data from both sensors in real-time to produce a signal as reliable as the robot kinematic data and as accurate as the motion capture data.

Challenge 2

Performing ADLs on a simulator, utilizing real-time force-feedback control at speeds corresponding the ADL in question was no easy task. This task was particularly challenging when performed on very stiff implants where small movements resulted in very high loads. There were various hardware limitations that made this task even more challenging including communication rates and latency (i.e., speed limits and delays with taking measurements and sending new position/velocity commands to the robot). Force control could also be a challenge and slower to converge because some degrees of freedom could be kinetically linked. In other words, if the robot rotated the knee joint to achieve a target torque, the robot could have been adding more compression force. If this happened, then the compression force controller would translate the joint to offload the extra compression force only to have more rotation torque imparted. This type of linking was a challenge with multi-axis force control and various features of the hybrid force and/or position controller can be utilized to improve simulation rate and accuracy in tracking of target loads.

Benefits Provided by the Hybrid Force and/or Position Controller to Challenge 2

In knee testing, the flexion axis was very lax while the other degrees of freedom were stiffer. For this reason, flexion was controlled using position control while the other degrees of freedom were controlled using force control. Another advantage of using the hybrid controller was that no single DOF was required to be 100% position or force control. Utilizing this feature, ADL simulations could be run very slowly in force control such that the loads could be applied accurately. The recorded motions from the slow simulation could then be applied to subsequent simulations so that each DOF was partially force control and partially position control. This allowed the simulation to be run at a much quicker rate because the positions that the robot needed to put the joint at to achieve the target loads could be iteratively learned via the adaptive compensation framework.

Material Removal

Manufacturing robots that can utilize force control can be organized into 3 categories of tasks: Assembly, Product Quality Testing, and Material Removal. Material removal can include a wide variety of tasks, such as grinding, polishing, sanding, deburring, milling, spot machining, weld grinding, weld spatter removal, laser brazing blending, and the like. Note that material removal has both force and position control components. For example, one end of the spectrum has polishing, where getting a smooth surface finish is the primary importance and the exact dimensions are less important than the surface finish. As another example, milling, where precise dimensions of the final product are important. However, even in milling applications the force could be monitored and used to control machining parameters such as feed-rate in order to protect the part and tooling from overloading.

Within the material removal domain, there are many applications that do not necessarily require 6-DOF force control. Sometimes 1-DOF is sufficient because the only force needing controlled could be the one pushing the tool and the part together. There are at least two companies that make products for these applications (Ferrobotics and PushCorp). Instead of force being controlled using a sensor at the end of the robot and commands to control the robot, a device mounted to the end of the robot can sense force in one direction and change its length in that same direction to maintain a specific force. Another way to think of this can be force control on top of the robot instead of force control through the robot.

Benefits Provided by the Hybrid Force and/or Position Controller

One downside with 1-DOF force control is that the angles that the sanding/grinding/polishing wheel need to be relative to the part cannot be sensed in real-time. Instead, they need to be preprogrammed based on some CAD model. Even then they can be sensitive to part and fixturing variability. Fixturing is the precise positioning of the part relative to the robot. If the part is in a slightly different place, the robot in position control will not know it and will not produce good results. Similarly, if a part is out of tolerance (i.e., high variability) the robot in position control will not know it and will not produce good results. To accommodate for all this, it can typically take weeks to months for engineers to create a robot program for a single part. This process with 1-DOF products is the current state-of-the-art for these applications and can get the time down to a couple days to a week. Using a 6-DOF hybrid force and/or position controller instead would not require months or even a week programming a robot for these applications. The controller can automatically control the force into the part as well as the torque on the contact surface such that the sanding/grinding/polishing wheel always stays level to the surface. With this approach only the general bounds of the part need to be known ahead of time. Part and fixture variability have significantly less influence on the end result. It also makes reworking of different part revisions possible. The time from getting a new part to programming the robot to work with the new part could be as little as a couple of minutes.

To demonstrate the utility, a system was created to polish a wok where the robot maintained a constant force pushing against the surface while constantly changing the angle with the surface. An intentionally crude fixture was designed to hold the wok without precise positioning capabilities. A simple planar circular trajectory was given to the robot and the polishing wheel followed the ever-changing surface contour using multi-axis force control. The wok could be positioned concave or convex and the same robot commands would follow the now inverted surface. This same concept could be applied to an automotive hood or fender and/or could be applied in aerospace with contoured helicopter and jet engine blades.

Benefits Provided by Pose Correction

The polishing wheel or abrasive commonly was mounted to some deformable foam or rubber backed object at the end of a compliant robot arm, and could be pushing against a surface which could deform as a function of the applied load (e.g., sheet metal). Ancillary sensors could be used to detect the spatial relationships and correct measurements of load and position in the system. The measurement of all the compliance data would not only be beneficial for the control, but could also be used to monitor and adjust upstream manufacturing processes.

From the above description, those skilled in the art will perceive improvements, changes and modifications. Such improvements, changes and modifications are within the skill of one in the art and are intended to be covered by the appended claims.

What is claimed is:

1. A system comprising:
an object attached to a manipulator of a robotic system and configured to be moved along a trajectory, wherein the trajectory is a path between a first location in space and a second location in space;
a primary sensor positioned at a first location on the object and configured to record position and orientation data, wherein the position and orientation data of the primary sensor includes mechanical compliance error;
at least one ancillary sensor, each positioned at a unique second location on the object and configured to record position and orientation data, wherein the at least one position and orientation data of the at least one ancillary sensor comprises less mechanical compliance error than the position and orientation data of the primary sensor, and
a controller comprising:
a non-transitory memory storing executable instructions; and
a processor executing the instructions to, at a sampling frequency:
retrieve the trajectory of the object;
when the object is at a point on the trajectory at a time:
sample the primary sensor to receive the position and orientation data of the primary sensor in a coordinate system at the time;
sample the at least one ancillary sensor to receive position and orientation data of the at least one ancillary sensor in the coordinate system at the time;
determine a delta value representing an amount of deviation between an initial static position and orientation of the primary sensor and an estimated position and orientation of the primary sensor at the time, wherein the amount of deviation is based on the position and orientation data of the primary sensor at the time, the position and orientation data of the at least one ancillary sensor at the time, and a static relationship between the primary sensor and the at least one ancillary sensor; and
modify execution of the trajectory of the object until a next time that the processor executes the instructions based on the sampling frequency to correct for compliance in the robotic system, the manipulator, and/or the object based on the delta value, the position and orientation data of the primary sensor at the time, and a static relationship between the initial static position and orientation of the primary sensor and an initial static position and orientation of a point on the object, wherein the object is moved along the trajectory with the modified execution until a new modified execution of the trajectory is determined at the next time.

2. The system of claim 1, wherein the processor further executes instructions to, before the object moves:
establish the coordinate system, wherein the point on the object is at a known initial position and orientation within the coordinate system;
receive initial position and orientation data in the coordinate system from the primary sensor;
determine the static relationship between the primary sensor and the object based on the initial position and orientation data of the primary sensor and the known initial position and orientation of the point on the object;
receive initial position and orientation data of the at least one ancillary sensor in the coordinate system from the at least one ancillary sensor;
determine a static relationship between the at least one ancillary sensor and the object based on the initial position and orientation data of the at least one ancillary sensor and the known initial position and orientation of the point on the object; and
determine the static relationship between the at least one ancillary sensor and the primary sensor based on the static relationship between the at least one ancillary sensor and the object and the static relationship between the primary sensor and the object.

3. The system of claim 2, wherein the initial position and orientation data of the primary sensor, the initial position and orientation data of the at least one ancillary sensor, the point on the object, the delta value, the position and orientation data of the primary sensor at the time, and the position and orientation data of the at least one ancillary sensor at the time are represented as homogenous 4×4 transformation matrices or a quaternion.

4. The system of claim 1, wherein the robotic manipulator is a tool within the robotic system or a base within the robotic system.

5. The system of claim 1, wherein the object is a rigid body or a deformable body.

6. The system of claim 1, wherein the primary sensor and the at least one ancillary sensor are motion tracking sensors.

7. The system of claim 1, wherein object is configured to be moved by the robotic system by rotation or translation.

8. The system of claim 1, wherein the object is configured to be moveable in from 1 to 6 degrees of freedom, wherein the execution of the trajectory is modified in each of the from 1 to 6 degrees of freedom.

9. The system of claim 1, wherein the modifying the execution of the trajectory further comprises correcting for compliance in the object, the manipulator, or the robotic system in one of a plurality of poses,
wherein the plurality of poses includes a position control pose, a gravity compensation pose, a force control pose, and an inertia/mass control pose.

10. The system of claim 1 further comprising:
a second object attached to another manipulator of the robotic system and configured to be moved along another trajectory, wherein the other trajectory is a path between another first location in space and another second location in space, wherein a point on the second object is at a known initial position and orientation;
a second primary sensor positioned at a first location on the second object and configured to record position and orientation data, wherein the position and orientation data of the second primary sensor includes mechanical compliance error;
and at least one second ancillary sensor, each positioned at a unique second location on the second object and configured to record position and orientation data, wherein the at least one position and orientation data of the at least one second ancillary sensor comprises less mechanical compliance error than the position and orientation data of the second primary sensor, wherein the processor further executes the instructions to, before the object and the second object move:
receive initial position and orientation data in the coordinate system from the second primary sensor;
determine a static relationship between the second primary sensor and the second object based on the initial position and orientation data of the second primary sensor and the known initial position and orientation of the point on the second object;
receive initial position and orientation data of the at least one second ancillary sensor in the coordinate system from the at least one second ancillary sensor;
determine a static relationship between the at least one second ancillary sensor and the second object based on the initial position and orientation data of the at least one second ancillary sensor and the known initial position and orientation of the point on the second object;
and determine a static relationship between the at least one second ancillary sensor and the second primary sensor based on the static relationship between the at least one second ancillary sensor and the second object and the static relationship between the second primary sensor and the second object.

11. The system of claim 10, wherein the processor further executes instructions to, at the sampling frequency, while at least one of the object and the second object is moving:
retrieve the other trajectory of the second object;
sample the second primary sensor to receive the position and orientation data of the second primary sensor at the time;
sample the at least one second ancillary sensor to receive position and orientation data of the at least one second ancillary sensor at the time;
determine an other delta value representing another amount of deviation between the initial static position and orientation of the second primary sensor and an estimated position and orientation of the second primary sensor at the time, wherein the other amount of deviation is based on based the position and orientation data of the second primary sensor at the time, the position and orientation data of the at least one second ancillary sensor at the time, and the static relationship between the second primary sensor and the at least one second ancillary sensor; and
modify execution of the trajectory of the second object until the next time that the processor executes the instructions based on the sampling frequency to correct for compliance in the robotic system, the manipulator, and/or the second object based on the other delta value, the position and orientation data of the second primary sensor at the time, and the static relationship between the initial static position and orientation of the second primary sensor and the initial static position and orientation of the point on the second object, wherein the second object is moved along the other trajectory with the modified execution until a new modified execution of the other trajectory is determined at the next time.

12. The system of claim 11, wherein the second object has a second coordinate system and a transformation between the coordinate system and the second coordinate system is known, the processor further executes the instructions to:
sample the second primary sensor and/or the at least one second ancillary sensor to receive position and orientation data in the second coordinate system; and
transform the position and orientation data of the second primary sensor and/or the at least one second ancillary sensor from the second coordinate system into the coordinate system.

13. The system of claim 1, wherein the processor further executes instructions to: filter the delta value and weight the delta value based on at least one of an accuracy, a proximity, a reliability, and a precision of the at least one ancillary sensor before modifying the execution of the trajectory of the object.

14. The system of claim 1, wherein the at least one ancillary sensor comprises two or more ancillary sensors and the processor further executes instructions to:
determine separate delta values for each of the two or more ancillary sensors;
filter the separate delta values;
weight each of the two or more ancillary sensors based on an accuracy and a health of each of the two or more ancillary sensors,
wherein
if one of the two or more ancillary sensors is detected as providing unhealthy data a last known healthy sensor position and orientation is heavily weighted by application of a scaling factor is to the last known healthy sensor position, and
then after the one of the two or more ancillary sensors is determined to be healthy again, transition to the one of the at least two or more ancillary sensors slowly because the last known healthy sensor position is heavily weighted; and
interpolate the separate delta values to determine the delta value used to modify the execution of the trajectory of the object.

15. The system of claim 14, wherein the interpolation is a quaternion weighted average.

16. A method for controlling movement of an object at a sampling frequency, the method comprising:
Retrieving, by a controller comprising a processor, a trajectory of the object attached to a manipulator of a robotic system controlled by the processor, wherein the trajectory is a path between a first location in space to a second location in space;

Sampling, by the controller, a primary sensor to receive position and orientation data of the primary sensor in a coordinate system at a time, wherein the primary sensor is positioned at a first location on the object and is configured to record the position and orientation data, wherein the position and orientation data of the primary sensor includes mechanical compliance error;

Sampling, by the controller, at least one ancillary sensor to receive position and orientation data of the at least one ancillary sensor in the coordinate system at the time, wherein each of the at least one ancillary sensor is positioned at a unique second location on the object and configured to record position and orientation data, wherein the at least one position and orientation data of the at least one ancillary sensor comprises less mechanical compliance error than the position and orientation data of the primary sensor;

Determining, by the controller, a delta value representing an amount of deviation between an initial static position and orientation of the primary sensor and an estimated position and orientation of the primary sensor at the time based on the position and orientation data of the primary sensor at the time, the position and orientation data of the at least one ancillary sensor at the time, and a static relationship between the primary sensor and the at least one ancillary sensor; and Modifying, by the controller, execution of the trajectory of the object until a next time that the processor executes the instructions based on the sampling frequency to correct for compliance in the robotic system, the manipulator, and/or the object based on the delta value, the position and orientation data of the primary sensor at the time, and a static relationship between the initial static position and orientation of the primary sensor and an initial static position and orientation of a point on the object, wherein the object is moved along the trajectory with the modified execution until a new modified execution of the trajectory is determined at the next time.

17. The method of claim 16 further comprising, before the object moves:
establishing, by the controller, the coordinate system, wherein the point on the object is at a known initial position and orientation within the coordinate system;
receiving, by the controller, initial position and orientation data in the coordinate system from the primary sensor;
determining, by the controller, the static relationship between the primary sensor and the object based on the initial position and orientation data of the primary sensor and the known initial position and orientation of the point on the object;
receiving, by the controller, initial position and orientation data of the at least one ancillary sensor in the coordinate system from the at least one ancillary sensor;
determining, by the controller, a static relationship between the at least one ancillary sensor and the object based on the initial position and orientation data of the at least one ancillary sensor and the known initial position and orientation of the point on the object; and
determining, by the controller, the static relationship between the at least one ancillary sensor and the primary sensor based on the static relationship between the at least one ancillary sensor and the object and the static relationship between the primary sensor and the object.

18. The method of claim 16 further comprising moving the object with the robotic system controlled by the controller in at least one of a rotation and a translation.

19. The method of claim 16, wherein modifying the execution of the trajectory further comprises modifying the execution of the trajectory in from 1 to 6 degrees of freedom.

20. The method of claim 16, wherein modifying the execution of the trajectory further comprises correcting for compliance in the object, the manipulator, or the robotic system in one of a plurality of poses, wherein the plurality of poses includes a position control pose, a gravity compensation pose, a force control pose, and an inertia/mass pose.

21. The method of claim 16, wherein the robot manipulator is a tool within the robotic system or a base within the robotic system.

22. The method of claim 16, wherein the object configured to be moved is one of a rigid body or a deformable body.

23. The method of claim 16, wherein the method includes controlling movement of a second object attached to another manipulator of the robotic system, further comprising, before the object and the second object move:
retrieving a known initial position and orientation of a point on the second object;
receiving, by the controller, initial position and orientation data from a second primary sensor positioned at a first location on the second object, wherein the second primary sensor is configured to record position and orientation data, wherein the position and orientation data of the second primary sensor includes mechanical compliance error;
determining, by the controller, a static relationship between the second primary sensor and the second object based on the initial position and orientation data from the second primary sensor and the known initial position and orientation of the point on the second object;
receiving, by the controller, initial position and orientation data in the second coordinate system from at least one second ancillary sensor, each of the at least one second ancillary sensors positioned at a unique second location on the second object, wherein the second ancillary sensor is configured to record position and orientation, and wherein the at least one position and orientation data of the at least one second ancillary sensor comprises less mechanical compliance error than the position and orientation data of the second primary sensor;
determining, by the controller, a static relationship between the at least one second ancillary sensor and the second object based on the initial position and orientation data of the at least one second ancillary sensor and the known initial position and orientation of the point on the second object;
and determining, by the controller, a static relationship between the at least one second ancillary sensor and the second primary sensor based on the static relationship between the at least one second ancillary sensor and the second object and the static relationship between the second primary sensor and the second object.

24. The method of claim 23 further comprising, while at least one of the object and the second object is moved by the robotic system:

retrieving, by the controller, a trajectory of the second object, wherein the trajectory of the second object is a path between another first location in space and another second location in space;

sampling, by the controller, the second primary sensor to receive position and orientation data of the second primary sensor at the time;

sampling, by the controller, the at least one second ancillary sensor to receive position and orientation data of the at least one second ancillary sensor at the time;

determining, by the controller, another delta value representing another amount of deviation between the initial static position and orientation of the second primary sensor and an estimated position and orientation of the second primary sensor at the time, wherein the other amount of deviation is based on the position and orientation data of the second primary sensor at the time, the position and orientation data of the at least one second ancillary sensor at the time, and the static relationship between the second primary sensor and the at least one second ancillary sensor; and modifying, by the controller, execution of the trajectory of the second object until a next time that the processor executes the instructions based on the sampling frequency to correct for compliance in the robotic system, the manipulator, and/or the second object based on the other delta value, the position and orientation data of the second primary sensor at the time, and the static relationship between the initial static position and orientation of the second primary sensor and the initial static position and orientation of the point on the second object, wherein the second object is moved along the trajectory of the second object with the modified execution until a new modified trajectory of the second object is determined at the next time.

25. The method of claim 23, wherein the second object has a second coordinate system and a transformation between the coordinate system and the second coordinate system is known, the method further comprising:

sampling, by the controller, the second primary sensor and/or the at least one second ancillary sensor to receive position and orientation data in the second coordinate system; and transforming, by the controller, the position and orientation data of the second primary sensor and/or the at least one second ancillary sensor from the second coordinate system into the coordinate system.

26. The method of claim 16, further comprising, before modifying the execution of the trajectory of the object:

filtering, by the controller, the delta value; and weighting, by the controller, the delta value based on at least one of a health, an accuracy, a proximity, a reliability, and a precision of the at least one ancillary sensor.

27. The method of claim 16, wherein the at least one ancillary sensor comprises two or more ancillary sensors and the determining the delta value further comprises:

determining, by the controller, separate delta values for each of the two or more ancillary sensors;

filtering, by the controller, the separate delta values;

weighting, by the controller, each of the two or more ancillary sensors based on an accuracy and a health of each of the two or more ancillary sensors, wherein if one of the two or more ancillary sensors provides unhealthy position data a last known healthy position data is heavily weighted by a scaling factor until a new healthy position data is provided by the one of the two or more ancillary sensors; and interpolating, by the controller, the separate delta values to determine the delta value used to modify the execution of the trajectory of the object.

28. The method of claim 27, wherein the interpolating further comprises quaternion weighted averaging of each of the separate delta values.

29. A system comprising:

an object attached to a manipulator of a robotic system and configured to be moved along a trajectory, wherein the trajectory is a path between a first location in space and a second location in space;

a primary sensor positioned at a first location on the object and configured to record position and orientation data;

at least one ancillary sensor, each positioned at a unique second location on the object and configured to record position and orientation data; and a controller comprising:

a non-transitory memory storing executable instructions; and a processor executing the instructions to, at a sampling frequency:

retrieve the trajectory of the object;

when the object is at a point on the trajectory at a time:

sample the primary sensor to receive the position and orientation data of the primary sensor in a coordinate system at the time;

sample the at least one ancillary sensor to receive position and orientation data of the at least one ancillary sensor in the coordinate system at the time;

determine a delta value representing an amount of deviation between an initial static position and orientation of the primary sensor and an estimated position and orientation of the primary sensor at the time, wherein the amount of deviation is based on the position and orientation data of the primary sensor at the time, the position and orientation data of the at least one ancillary sensor at the time, and a static relationship between the primary sensor and the at least one ancillary sensor; and modify execution of the trajectory of the object until a next time that the processor executes the instructions based on the sampling frequency to correct for compliance in the robotic system, the manipulator, and/or the object based on the delta value, the position and orientation data of the primary sensor at the time, and a static relationship between the initial static position and orientation of the primary sensor and an initial static position and orientation of a point on the object, wherein the object is moved along the trajectory with the modified execution until a new modified execution of the trajectory is determined at the next time.

* * * * *